(12) United States Patent  (10) Patent No.: US 8,935,580 B2
Bims  (45) Date of Patent: Jan. 13, 2015

(54) MULTIMEDIA-AWARE QUALITY-OF-SERVICE AND ERROR CORRECTION PROVISIONING

(71) Applicant: Apple Inc., Cupertino, CA (US)

(72) Inventor: Harry Bims, Menlo Park, CA (US)

(*) Notice: Subject to any disclaimer, the term of this patent is extended or adjusted under 35 U.S.C. 154(b) by 0 days.

(21) Appl. No.: 13/921,147

(22) Filed: Jun. 18, 2013

(65) Prior Publication Data

US 2013/0287023 A1  Oct. 31, 2013

Related U.S. Application Data

(63) Continuation of application No. 12/217,308, filed on Jul. 2, 2008, now Pat. No. 8,468,426.

(51) Int. Cl.
*G06F 11/00* (2006.01)
*H04L 12/725* (2013.01)
*H04L 1/00* (2006.01)
*H04W 72/12* (2009.01)

(52) U.S. Cl.
CPC ............ *H04L 45/302* (2013.01); *H04L 1/0009* (2013.01); *H04L 1/0018* (2013.01); *H04W 72/1236* (2013.01)
USPC .......................................................... 714/52

(58) Field of Classification Search
USPC .......................................... 714/52, 752, 774
See application file for complete search history.

(56) References Cited

U.S. PATENT DOCUMENTS

| | | | |
|---|---|---|---|
| 6,026,164 A * | 2/2000 | Sakamoto et al. | 380/217 |
| 6,134,243 A * | 10/2000 | Jones et al. | 370/465 |
| 6,934,752 B1 * | 8/2005 | Gubbi | 709/225 |
| 7,068,645 B1 * | 6/2006 | Phadnis et al. | 370/352 |
| 8,468,426 B2 * | 6/2013 | Bims | 714/774 |
| 2001/0033581 A1 * | 10/2001 | Kawarai et al. | 370/468 |
| 2001/0053149 A1 * | 12/2001 | Mo et al. | 370/389 |
| 2002/0024944 A1 * | 2/2002 | Zhang et al. | 370/349 |
| 2002/0093913 A1 * | 7/2002 | Brown et al. | 370/232 |
| 2002/0126675 A1 * | 9/2002 | Yoshimura et al. | 370/395.21 |
| 2003/0012372 A1 * | 1/2003 | Cheng | 380/28 |
| 2004/0202156 A1 * | 10/2004 | Fonden et al. | 370/389 |
| 2004/0223611 A1 * | 11/2004 | Yan et al. | 380/37 |
| 2005/0220011 A1 * | 10/2005 | Parker et al. | 370/229 |
| 2005/0233728 A1 * | 10/2005 | Karaoguz et al. | 455/406 |
| 2005/0276259 A1 * | 12/2005 | Nakabayashi et al. | 370/349 |
| 2008/0192763 A1 * | 8/2008 | Davis et al. | 370/412 |

* cited by examiner

*Primary Examiner* — Joshua Lohn

(74) *Attorney, Agent, or Firm* — Womble Carlyle Sandridge & Rice, LLP

(57) ABSTRACT

Methods and apparatus for associating each data packet in a media stream with logic corresponding to a particular quality-of-service (QoS) and/or error correction requirement. In an exemplary embodiment, each packet in the media stream is assigned a frame tag which designates a particular quality-of-service and/or error correction scheme for the corresponding packet. At least a portion of each packet is encoded according to the packet's designated quality-of-service as indicated by the frame tag. A receiver accesses the frame tags from within the transmitted media stream in order to determine the appropriate means for processing or decoding the encoded portion of each packet. In this manner, each packet within the media stream can have its own quality-of-service and/or error correction requirements and processing, thereby enhancing link efficiency and better enforcing QoS policy across the system.

20 Claims, 18 Drawing Sheets

Fig. 2b

| | Packet ID 218 | QoS Class 220 | FEC Mode 222 |
|---|---|---|---|
| Hint Track 214 | | | |
| Frame Tags 216(1-n) | Packet 1 | 13 | 7 |
| | Packet 2 | 8 | 3 |
| | Packet 3 | 13 | 7 |
| | Packet 4 | 8 | 3 |
| | Packet 5 | 9 | 1 |
| | Packet 6 | 9 | 1 |
| | Packet 7 | 9 | 1 |
| | Packet 8 | 9 | 1 |
| | Packet 9 | 13 | 7 |
| | Packet 10 | 13 | 7 |
| | Packet 11 | 8 | 3 |
| | Packet 12 | 13 | 7 |
| | Packet 13 | 8 | 3 |
| | Packet 14 | 9 | 1 |
| | Packet 15 | 9 | 3 |
| | Packet 16 | 9 | 1 |
| | Packet 17 | 9 | 1 |
| | ... | ... | ... |
| | Packet n | 13 | 7 |

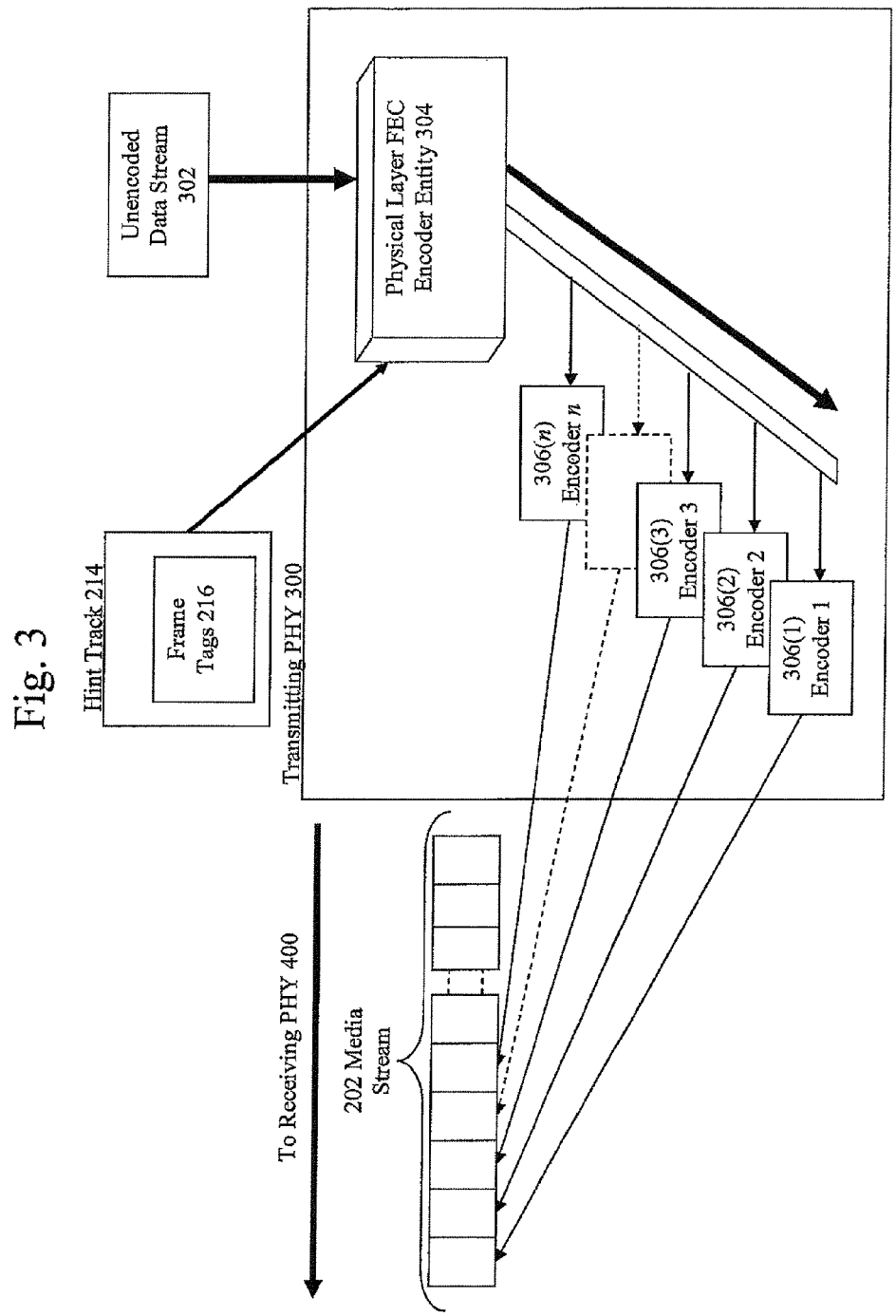

MULTIMEDIA-AWARE QUALITY-OF-SERVICE AND ERROR CORRECTION PROVISIONING

PRIORITY

This application is a continuation of and claims priority to co-owned U.S. patent application Ser. No. 12/217,308 filed Jul. 2, 2008 and entitled "MULTIMEDIA-AWARE QUALITY-OF-SERVICE AND ERROR CORRECTION PROVISIONING", (issuing as U.S. Pat. No. 8,468,426), the forgoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of quality-of-set-vice (QoS) maintenance or enhancement over a data network. More specifically, the present invention is in one exemplary aspect directed to providing packets in a media stream with their own QoS and forward error correction (FEC) mechanism.

2. Description of Related Technology

So-called "Quality-of-service" or QoS refers generally to resource reservation and allocation control mechanisms. For example, QoS when implemented can provide different priority to different data flows, or guarantee a certain level of performance to a data flow. The goal of QoS is to improve the user experience and a network's ability to deliver predictable results for sensitive applications such as audio, video, and voice applications. Elements of network performance within the scope of QoS often include bandwidth (throughput), latency (delay), and error rate. There are generally two broad classes of QoS: data reliability and temporal reliability. Each makes different demands on network technologies.

QoS utilization and allocation of resources have long been implemented and described in the prior art for various other types of networks including, inter alia, packet switched networks. For example, U.S. Pat. No. 5,488,609 to Hluchyj, et al. issued Jan. 30, 1996 and entitled "Dynamic rate adjustment for overload control in communication networks" is exemplary of one such implementation. It discloses a device (500) and method (300) which provide for management of resource allocation on selected links in a connection-oriented communication network such that existing connections may share the burden of freeing up resources for accommodating new connections. The rate of certain connections is dynamically adjusted for the entire connection using information on the status of each link selected or marked for reallocation. Links are marked based on control information in the link state, and the in-call rate adjustment is based on negotiable Quality-of-service (QoS) parameters.

The current generation protocol standards for broadband access networks provide for a Quality-of-service (QoS) provisioning and forward error correction (FEC) provisioning of downlink data streams that is uniformly applied to all packets in a data stream. Examples of such networks include so-called "3G" (Third Generation) cellular and IEEE 802.11e networks. However, many multimedia streams, such as MPEG streams, contain a heterogeneous mix of packet types. Each type of packet within the stream can potentially be encoded differently according to media type (e.g. a different audio or video codec), and have its own QoS and/or error correction requirements. In addition, each type of packet can potentially be further differentiated according to frame type for a given codec. In some applications, QoS requirements and/or error correction requirements may change dynamically over the lifetime of the multimedia stream on the downlink. For example, FIG. 1 (prior art MPEG decoding) illustrates an MPEG video encoding 100 comprising three frame types, Intra frames 102 (I-frames), Predictive frames 104 (P-frames), and Bi-directional frames 106 (B-frames). I-frames are generally more important to an MPEG video codec than P-frames, and P-frames are generally more important to an MPEG video codec than B-fumes. This is because P-frames are dependent on previous I-frames and P-frames, and B-frames are dependent on previous and future I-frames and P-frames. As a result, the loss of a B-frame will not affect I-frame and P-frame processing, yet the loss of a P-frame, though not affecting I-frame processing, may affect B-frame processing. Finally, the loss of an I-frame may affect both P-frame and B-frame processing.

One of the primary goals of video compression is to reduce the size (in bytes) of any particular video stream; MPEG compression thus aims to accomplish this reduction by removing spatial redundancy from within each video frame, and temporal redundancy between video frames. Such redundancy is known to occur frequently in video streams. For example, in a scene where a person moves in front of a stationary background, only the moving regions need to be represented. The parts of the scene that are not changing are redundant and therefore do not need to be transmitted repeatedly.

A variety of approaches are often used to minimize this redundancy, and therefore also minimize the information necessary for displaying the entire video stream. In some cases, data representing an entire image is required to be transmitted, while in other cases, the only data that is necessary is the data representing the differences between the current image and the prior one. Other approaches can also be utilized, such as techniques in global motion compensation, block motion compensation, variable block-size motion compensation, motion estimation, etc. Typically, the approach which requires the fewest bits for image representation is the approach which is deemed optimal for a particular instant in time. Since the optimal approach usually varies with time (and in many instances, may also depend upon what image was sent in the prior instant in time), then in these cases, a plurality of frame types is used in order to accomplish optimization of the video stream (for example, in an MPEG stream, the I-frame, B-frame, and P-frame formats discussed above).

FIG. 2 is a block diagram illustrating a generalized three node transmission stream sequence as known in the prior art. A media stream 202 is transmitted from an application server 206 to a base station 208; the base station transmits the media stream to the mobile station 210. As shown by the figure, the media stream comprises n data packets 200, 200(1)-200(n), where each data packet is assigned to one of i packet types 204, 204(1)-204(i). The sequencing of the transmitted packets need not necessarily correspond with any sequencing of possible packet types. For example, the first and second packets 200(1) 200(2) in the stream 202 might be a Type 1 packet 204(1), while the third packet 200(3) might be a Type 2 packet 204(2).

Irrespective of packet type 204, the access network or base station 208 selects an appropriate transmission mode for all data packets 200 in the media stream 202. This mode is selected based upon what is necessary for the transmitter 208 to accommodate the highest QoS necessary for any individual packet 200(1)-200($n$) within the stream 202, to ensure timely delivery at the mobile station 210. The mode selected may potentially also select the most expansive error correction protocol necessary to reasonably accommodate the transmission of any individual packet 200(1)-200($n$) within the media stream 202. In this manner, the mode selected may be chosen based upon any of the following aspects of a connection (or combination thereof): time to provide service, audio quality, video quality, echo, loss, reliability, and/or error correction. The mobile receiver 210 comprises any logic necessary for accommodating the transmission mode selected.

Traditionally, access networks 208 parse the "Type of Service" field in an IPv4 header, or the "Traffic Class field" in an IPv6 header to determine data handling processes. These field values are mapped by the access network to an internal QoS policy and/or error correction policy for delivery. For certain applications (e.g. MPEG data streams), various packets within a data stream require different QoS levels. Referring back to FIG. 1, a media stream comprised of I-frames 102, B-frames 106, and P-frames 104 is being transmitted by an access network. As previously mentioned, the base station selects an appropriate transmission mode for all data packets within the media stream. The transmitter operates on "physical" and "medium access control" layers, and must treat the media stream as a single unified data stream. The transmitter does not have sufficient computing resources to further classify packets by a combination of the application and its individual application-layer packet types (the transmitter does not have "application layer" processing capabilities). Even with sufficient resources to perform application layer classification, the transmitter cannot duplicate the decision logic within every application that dynamically chooses the correct QoS requirements for individual packet types. Due to the media stream's mixed composition of frames, the transmitting device must accommodate the highest level of both QoS and error correction (the I-frame is the most critical frame type for MPEG encoding/decoding, and will necessitate high QoS and error correction for the entire media stream).

Current and next generation access networks can perform deeper packet inspection than the aforementioned "Type of Service" fields in order to perform the packet classification required for QoS policy enforcement. Deeper packet inspection can allow packet classification of higher protocol layers in application streams with such classification mapped to specific QoS policies. However, as these solutions do not perform application-aware functionality (for aforementioned reasons), and require the access network to be programmed ahead of time with the proper QoS policy of every class of application stream that is supported by the access network. Supported application stream classes must be determined a-priori by a management system component of the access network and communicated to every base station in the access network. In this way, all application streams that are mapped to a particular stream class by a base station will have the same QoS policy enforced.

Since the access network cannot anticipate every possible application that might use the network to stream multimedia packets, it cannot rely upon packet classification to identify any and all future applications whose streams are transported over the access network. Instead, all possible classes of streams that are supported by the QoS policies are identified. Each application stream is thereby mapped to a particular stream class by the packet classification algorithm. As a result, a plurality of application streams might result in the same classification without the awareness of the base station.

As evidenced by this arrangement, the prior art relies upon a common logic in order to process each data packet 200(1)-200($n$) arriving at the mobile station 210. The prior art is inefficient in the sense that certain packet types need not require the same error correction/quality-of-service provisioning necessary for other packets types. More specifically, the error correction/quality-of-service provisioning cannot change dynamically during the media stream session. Static provisioning for packet types of changing requirements often unnecessarily wastes high priority network resources on lower priority packet types, and increases the number of bytes necessary for transmitting the entire media stream 202 (and likewise, increases the media stream's 202 expected transfer time). At the other extreme, selecting a less stringent transmission mode for the media stream 202 in order to increase transfer speed results in lower priority network resources being used for high priority packet types, and unacceptable packet error rates. In the same vein, selecting an error correction protocol with less redundancy often requires retransmission of all or part of the media stream 202 in the event that errors ultimately occur. In some cases, the efficiency gains associated with the selection of an error correction protocol with less redundancy are more than offset by the efficiency costs of retransmission.

For example, an iTunes movie that is viewed on a client device as it is being streamed (let's say a user is watching a preview) may have a very different QoS requirement set for P-frames, B-frames, and I-frames, than an iTunes movie that is downloaded to the client device in the background for later viewing offline. For every variation in downlink QoS requirements demanded by the iTunes application, the access network would have to maintain a separate stream classification. This can become impractical for large numbers of applications with large numbers of stream types per application.

U.S. Pat. No. 7,085,291 to Zhang et al. filed on Aug. 1, 2006 discloses an enhanced radio link protocol (RLP) in a wireless access network that is network aware. The RLP attempts to increase radio link quality by various Automatic Repeat reQuest (ARQ) mechanisms. The RLP framing structure included supports and enables at least network layer packet boundary detection, dynamic and adaptive ARQ schemes for QoS support on a per-packet basis, and an RLP frame structure for fast adaptation to physical layer channel rate/RLP frame sizes. Optional uses include supporting negative acknowledgment (NAK) based ARQ.

U.S. Pat. No. 7,301,928 to Nakabayashi et al, filed on Nov. 27, 2007 discloses an error correction encoding rate selection table provided in an error correction processing unit of a packet transfer apparatus. The table stores an error correction encoding rate preset to maintain a desired QoS in correspondence with a protocol type and an application type. When a transmission packet is transferred to a wireless transmission path, an encoding control unit judges the protocol type and application type of a transmission packet from a header of the transmission packet, and in accordance with a judgment result and the error correction encoding rate selection table, an error correction encoding rate is selected, and the transmission packet is subjected to error correction encoding and transferred.

U.S. Pat. No. 7,075,927 to Mo et al. filed on Jul. 11, 2006 discloses a method and system for transporting traffic having disparate qualities of service classes across a packet-switched network that includes receiving at an ingress node of a network a plurality of packets, some of which comprise a transport label, where the transport label has an associated QoS class that is defined externally to the network. Packets having a QoS class comprising delay bound guarantees and a low drop priority are combined into a first internal QoS class. Packets having a QoS class comprising a flexible drop priority and no delay bound guarantees are combined into a second internal QoS class. Packets having a QoS class including no delivery guarantees are combined into a third internal QoS class. The packets are transmitted in the network based on their internal QoS class.

U.S. Pat. No. 7,016,366 to Kawarai et al. filed on Mar. 21, 2006 discloses a method to achieve QoS control, drop control and multicast control of a variable-length packet at high speed in small-scale hardware. A packet divider divides a variable-length packet into fixed-length packets, and an input buffer section stores the divided fixed-length packets into queues by output lines and by QoS classes. A large number of QoS classes are mapped into only two kinds of classes including a guaranteed bandwidth class for which an assigned bandwidth is guaranteed and a best effort class for which a surplus bandwidth is allocated, thereby to achieve scheduling at the input side by an inter-line scheduler. An output buffer section assembles a variable-length packet from fixed-length packets that have been obtained by switching at a switch section in an output buffer section. A QoS control is performed based on a packet length.

U.S. Pat. No. 7,263,064 to Yoshimura et al. filed on Aug. 28, 2007 discloses a method for transmitting packets classified according to QoS requirement from a transmitting node to a receiving node. The transmitting node is configured to select sequentially a QoS class, to divide a queued packet to be transmitted into a plurality of predetermined data units, to transmit one of the predetermined data units, and to apply a transmitter-side retransmission control process to the data unit to be transmitted when the selected class is a QoS class specified for data type packets. The receiving node is configured to receive sequentially the data units transmitted from the transmitting node, to assemble a plurality of received data units to restore an original packet for each QoS class, and to apply a receiver-side retransmission control process to the received data units when the received data unit belongs to one of the data type QoS classes.

U.S. Pat. No. 7,292,591 to Parker et al. filed on Nov. 6, 2007 discloses a packet processing system architecture and method. According to a first aspect of the invention, packet parser functions are distributed throughout a packet processing system comprising a packet classification system and a packet modification system. According to a second aspect of the invention, an egress mirroring function is provided to the system. According to a third aspect of this invention, a multi-dimensional quality-of-service indicator for a packet is provided. According to a fourth aspect of this invention, a cascaded combination of multiple, replicated packet processing systems is used to process a packet. A fifth aspect of this invention involves any combination of one or more of the foregoing.

U.S. Pat. No. 7,280,562 to Sindhushayana et al. filed on Oct. 9, 2007 discloses a method and apparatus for variable length Physical Layer packet generation. Multiple Security Layer packets may be multiplexed into a single Physical Layer packet to increase efficiency, wherein the Multiple Security Layer packets may have variable lengths. In one embodiment, different format Multiple Security Layer packets for different users are combined into capsules that form the Physical Layer packet. Shorter packets are for users in poor channel conditions or requiring smaller amounts of data due to the applications and the accompanying QoS requirements. In one embodiment, a modified Preamble structure provides for Unicast or multi-user packets. Alternate embodiment provides modified Rate Sets, a mechanism for identifying ACK from a single-user packet or a multiplexed packet (delayed ACK), ON/OFF keying for ACK channel v/s bipolar keying used in IS-856, and/or multi-valued interpretation of DRC.

U.S. Pat. No. 7,180,860 to Fonden et al. filed on Feb. 20, 2007 discloses a method for the provision of a defined quality-of-service in a packet switched communication system with interconnected nodes for the forwarding of data packets is described. The system comprises at least one edge node for the connection to user equipment or a further communication system and for processing data packets. The packets comprise a data field specifying the handling of the packets and the nodes perform a differentiated handling of packets according to said data field. The communication system comprises or is connectable to a database which contains a record for a user specifying a quality-of-service. An edge node which processes a packet for said user is provided with quality parameters from the database. The edge node sets the data field specifying the handling of the packet according to the record. Devices and programs to perform the method are also described.

European Patent Publication No. EP1739900 to Lin entitled "A METHOD FOR ACQUIRING THE QOS OF THE MULTIMEDIA STREAM PERIODICALLY" discloses a method for acquiring media stream Quality of Service (QoS) periodically. The MGC sets an inspect duration during which the MGC periodically acquires the QoS information of the media stream, thereby acquiring the QoS information of the media stream and controlling the media stream. Two ways for the MGC periodically acquiring the QoS information are provided. The MG actively submits the QoS information to the MGC and the MG submits the QoS information to the MGC according to the periodic request of the MGC. One embodiment provides the capability of adjusting the call microscopic QoS, enhances the real-time quality of evaluating the QoS and that of dynamically adjusting call control strategy, inherits the ability of the original protocol for evaluating the microscopic QoS of the network during a certain period and ostensibly provides more accurate evaluation.

U.S. Pat. No. 7,068,645 to Phadnis et al. filed on Jun. 27, 2006 discloses a network device (for example, a network access server or home gateway) providing different quality-of-services to different layer-3 datagrams when transporting on tunnels. A tunnel may be implemented to provide different QoS to different packets depending on the packet header. The network device examines the header of each datagram to determine the specific QoS to be provided. At least the data portion in the datagram is encapsulated for transportation on the tunnel. The encapsulated data portion in turn is encapsulated in the form of one or more packets, with the packet format to reflect the QoS determined for the datagram. When the tunnel is implemented on UDP/IP and the datagram is an IP (Internet protocol) datagram, the TOS/Precedence bits of the IP datagram may be copied into the precedence/TOS bits of the UDP/IP packet(s).

U.S. Pat. No. 5,581,544 to Hamada, et al. issued Dec. 3, 1996 and entitled "Method and apparatus for evaluating in ATM multiplexing apparatus in which priority control is performed and for controlling call admissions and optimizing priority control on the basis of the evaluation" discloses a probability transition matrix $S_t$ that expresses a multiplexing process which includes nested threshold priority control and classified priority control. A state equation using the matrix $S_t$ is solved by substituting therein upper and lower bounds of a probability distribution of a cell arrival count $a_t$ in an average time series, to calculate a probability distribution of a cell length in a buffer. From the thus calculated cell length probability distribution, the QoS is evaluated on a priority class basis. Based on the QoS evaluation, optimization of call admission control and priority control is accomplished.

U.S. Pat. No. 7,283,803 to Karaoguz, et al. issued Oct. 16, 2007 and entitled "Location-aware application based quality-of-service (QoS) via a broadband access gateway" discloses a system and method supporting access to multimedia information based upon user-defined quality-of-service criteria is disclosed. A broadband access gateway may coordinate network behavior during the transition of an access device among communication pathways having different available capacities. Adjustments in bitrates and levels of compression may be made based upon the user-defined quality-of-service criteria. The user may be notified when network conditions disallow support for the desired quality-of-service, and may choose to override selected criteria. The user-defined quality-of-service criteria may be stored within the gateway and associated with a user, or may be located in the access device and accessible to the gateway.

Finally, prior art methods are inefficient because each type of access network (e.g. Wi-Fi, LTE, or WiMAX) can potentially have its own unique set of QoS policy parameters. This means that each access network could translate the same packet into a slightly different access network QoS policy, having undesirable results as the mobile device roams from one access network to another.

Forward Error Correction (FEC)

Forward error correction (FEC) is a system of error control and correction useful in digital data transmission. In a typical FEC implementation, the transmitter adds redundant data to its outgoing messages in the form of a systematic or non-systematic error correction code. This approach allows the receiver of the data (including the embedded or associated FEC data) to detect and correct errors without the need to ask the transmitter for additional data (such as via a retransmission). As the name implies, the error correction code enables the receiver to "reconstruct" the original data sequence by knowing how it was originally encoded at the transmitter. One advantage of forward error correction is that retransmission of data can often be avoided (thereby obviating associated higher bandwidth requirements). FEC is therefore particularly useful in situations where data retransmissions are expensive, cost-prohibitive, or even unavailable.

Two primary categories of FEC include block coding and convolutional coding. Block codes are applied to fixed-size blocks (packets) of bits or symbols of predetermined size. Convolutional codes are applied to a bit or symbol streams of arbitrary length. Numerous types of block codes exist, one of the most notable being Reed-Solomon coding. Reed-Solomon coding is widely used for example on compact discs, DVDs, and in computer hard drives (HDDs). Other types of block codes include Golay, BCH and Hamming codes, each of which are also well known in the art.

Convolutional codes are most often decoded with the Viterbi algorithm, though other algorithms are sometimes used. Convolutional codes are those which (a) each m-bit information symbol (each m-bit string) to be encoded is transformed into an n-bit symbol, where m/n is the code rate (n≥m) and (b) the transformation is a function of the last k information symbols, where k is the constraint length of the code. Convolutional codes may be recursive or non-recursive, and like block codes systematic or non-systematic as well.

Trellis codes are another form of convolutional code. The name "trellis" was coined because a state diagram of the technique, when drawn on paper closely resembles the trellis lattice used in a rose garden. The scheme is basically a convolutional code of rates (r, r+1).

Block and convolutional codes are sometimes combined in concatenated coding schemes in which the convolutional code and the block code (usually Reed-Solomon) cooperate to provide a synergistic effect.

Another type of channel error correction coding is the well known "turbo" code, a scheme that combines two or more relatively simple convolutional codes and an interleaver to produce a block code that can reach performance very close to that of the theoretical Shannon limit with much less decoding complexity than the Viterbi algorithm on the long convolutional codes that would be required for the same performance. See, e.g., U.S. Pat. No. 5,446,747 to Berrou entitled "Error-correction coding method with at least two systematic convolutional codings in parallel, corresponding iterative decoding method, decoding module and decoder" issued Aug. 29, 1995 and incorporated herein by reference in its entirety.

Code "puncturing" is a technique used to make an m/n rate code from a "basic" rate ½ code. It is reached by deletion of some bits in the encoder output. Bits are deleted according to puncturing matrix. The specific order of transmission is defined by the respective communication standard. Punctured convolutional codes are widely used in satellite communications, for example, in digital video broadcasting (DVB).

Low-density parity-check (LDPC) codes are a class of linear block LDPC codes. Their name comes from the characteristic of their parity-check matrix which is said to be sparse (i.e., contains only a few 1's in comparison to the amount of 0's). The main advantage of LDPC codes is that they provide a very high level of performance (close to the Shannon limit) for many different channels and linear-time complex algorithms for decoding. Furthermore, they are suited for implementations that make heavy use of parallelism. Despite the foregoing wide range of approaches to implementing QoS policy and forward error correction (FEC) within digital communication systems, improved methods and apparatus for allowing each packet in a media stream to have its own quality-of-service and/or error correction requirements are needed. In this manner, efficiency gains during transmissions of data streams may be realized, since the transmission of redundant data bearing only a marginal utility would thereby be reduced and/or eliminated, yet without significantly increasing the likelihood of performing inefficient retransmissions of the data.

Such improved methods and apparatus would also ideally enable specific quality-of-service and/or error correction logic to apply to packets on an individual basis and set the priority for different types of data packets or frames; e.g., such as prioritizing I-frames over P-frames and P-frames over B-frames, etc.

SUMMARY OF THE INVENTION

The present invention addresses the foregoing needs by disclosing apparatus and methods adapted to allow each packet or frame in a data stream to have its own quality-of-service policy and/or forward error correction protocol.

In a first aspect of the invention, a method of communicating application-layer packets of a plurality of different types is disclosed. In one embodiment, the method comprises: designating at least a portion of the packets according to at least one quality-of-service class; and communicating the designation to an access network.

In one variant, the designation comprises a frame tag, and the communicating comprises transmitting the frame tag to the access network via a media stream. The frame tag is comprised within a hint track of the media stream.

In another variant, the method further comprises encoding at least a portion of the data packets according to at least one error correction encoding scheme, the frame tag further indicating the encoding scheme. The frame tag further indicates a decoding scheme to be used to decode the at least portion of the packets.

In yet another variant, the method further comprises: reading the decoding scheme indicated in the frame tag; and decoding the encoded data based at least in part upon the reading.

In still a further variant, the media stream comprises an MP3 media stream, and the at least one quality-of-service class comprises: (i) an I-frame class; (ii) a P-frame class; and (iii) a B-frame class.

In a second aspect of the invention, a method or processing data packets is disclosed. In one variant, the method comprises: receiving a transmission stream comprising the packets, at least a portion of which has been encoded by a first encoding module, wherein the first encoding module is selected based at least in part upon a first error correction scheme; reading at least a portion of the transmission stream in order to identify a first decoding module appropriate for the error correction scheme; and decoding the encoded at least portion of the transmission stream using the first decoding module.

In one variant, the reading at least a portion of the transmission stream in order to identify a first decoding module comprises reading a frame tag. The frame tag indicates a frame type, the frame type selected from a plurality of heterogeneous types existing within the stream. For example, the frame type is selected from the group consisting of: P-frame, I-frame, and B-frame.

In another variant, the frame tag is comprised within a hint track of the transmission stream.

In yet another variant, the transmission stream comprises at least a portion of the packets which have been encoded by a second encoding module selected based at least in part upon a second error correction scheme different from the first scheme.

Different types of error correction may be applied, including e.g., turbo coding, Reed-Solomon coding, or convolutional (e.g., Viterbi) coding.

In another variant, the method further comprising selecting one of a plurality of QoS profiles to apply to the at least portion of the stream based at least in part on the frame tag.

In another embodiment, the method of processing data packets comprises: receiving a plurality of packets from a source; determining to which of a plurality of quality-of-service classes at least a portion of the packets in the plurality belong; and processing the at least portion of packets according to respective ones of quality-of-service profiles associated with their respective classes.

In one variant, the plurality of data packets comprises a media stream, the media stream comprising a plurality of heterogeneous packet types.

The heterogeneous packet types may be selected from the group consisting of P-frames, I-frames, and B-frames.

In another variant, the method further comprises including a frame tag within each of the packets of the at least portion, the frame tag designating the respective quality-of-service class of that packet.

In yet another variant, the method further comprises including a frame tag within each of the packets of the at least portion, the frame tag designating the respective packet type. Information indicating that a prescribed type of error correction encoding is required may be included within each of the packets of the at least portion.

In a third aspect of the invention, a method of processing data frames associated with one or more multimedia streams is disclosed. In one embodiment, the method comprises: receiving the one or more streams, the streams comprising at least one frame tag identifying a frame type; reading the at least one frame tag; and based at least in part on the reading, processing at least one of the packets according to a quality-of-service (QoS) profile associated with the frame type.

In one variant, the at least one frame tag is disposed substantially within a hint track of the one or more streams.

In another variant, the method further comprises using the at least one frame tag to determine which of a plurality of forward error correction decoders to apply to decode the at least one packet.

In still another variant, the streams further comprise a second frame tag associated with the at least one packet, and the method further comprises: reading the second frame tag; and based on the reading, using the second frame tag to determine which of a plurality of forward error correction decoders to apply to decode the at least one packet.

In a fourth aspect of the invention, a method of error-correcting data within a digital media stream is disclosed. In one embodiment, the method comprises selecting an appropriate forward error correction (FEC) encoder and decoder pair based at least in part on one or more frame tags supplied within one or more hint tracks of the media stream.

In one variant, the one or more frame tags indicate one of a plurality of heterogeneous frame types, each of the heterogeneous frame types requiring at least one of a encoding or decoding which is different from that of the others of the plurality of types.

In another variant, the method further comprises selecting the one or more frame tags based at least in part on one or more conditions associated with an access medium over which the media stream will be transmitted.

In yet another variant, the one or more frame tags comprise a plurality of heterogeneous frame tags associated with respective ones of a plurality of heterogeneous frame types, and the method further comprises selecting one of the plurality of frame tags for use with a frame of the stream based at least in part on the frame type of the frame.

In a fifth aspect of the invention, a computerized device is disclosed. In one embodiment, the device is adapted for use in a wireless network, and comprises: a processor; a storage device in data communication with the processor; and a computer program stored at least in part on the storage device and comprising a plurality of instructions which, when executed, error-correct data within a digital media stream according to the method comprising: selecting an appropriate forward error correction (FEC) encoder based at least in part on one or more frame tags supplied within one or more hint tracks of the media stream; and encoding at least a portion of the stream using the selected encoder.

In one variant, the device comprises a cellular base station.

In another variant, the device comprises a wireless relay station.

In another variant, the device comprises a cellular telephone or smartphone.

In yet another variant, the device comprises a WiFi- or WiMAX-enabled laptop computer.

In a further embodiment, the selected FEC encoder comprises a turbo coder.

In still another embodiment, the computer program is further adapted to assign ones of packets or frames within the stream to respective ones of a plurality of quality-of-service classes according to information present in the stream. The information present in the stream comprises the one or more frame tags.

In a sixth aspect of the invention, a computer-readable apparatus comprising a storage medium is disclosed. In one embodiment, the medium is adapted to store a computer program, the program comprising a plurality of instructions which, when executed, error-correct data within a digital media stream by: selecting an appropriate forward error correction (FEC) encoder based at least in part on one or more frame tags supplied within a hint track of the media stream; and encoding at least a portion of the stream using the selected encoder.

In one variant, the data comprises a plurality of source digital data elements, and the act of encoding comprises: implementing at least two independent and parallel steps of systematic convolutional coding, each of the coding steps taking account of all of the source data elements and providing parallel outputs of distinct series of coded data elements; and temporally interleaving the source data elements to modify the order in which the source data elements are taken into account for at least one of the coding steps.

In another embodiment, the computer program comprises a plurality of instructions which, when executed, process encoded data within a digital media stream by: reading at least portions of the encoded data of the stream; selecting an appropriate forward error correction (FEC) decoder based at least in part on one or more frame tags supplied within the at least portions of the media stream; and decoding at least a portion of the stream using the selected decoder, the decoding comprising correcting at least one bit error within the data.

In one variant, the data comprises a plurality of source digital data elements, and the act of decoding comprises an iterative decoding procedure including the steps of: in a first iteration, combining each of the received digital data elements with a predetermined value to form an intermediate data element, decoding the intermediate data element representing each received data element to produce a decoded data element, estimating the source data element, using at least the decoded data element, to produce an estimated data element, and for all subsequent iterations, combining each of the received data elements with one of the estimated data elements estimated during a preceding iteration.

In a seventh aspect of the invention, a method of doing business is disclosed. In one embodiment, the method comprises: providing a user a multimedia capable device, the device comprising a wireless interface adapted to communicate multimedia data over a wireless network; enabling the device to transmit the multimedia data, the transmission comprising: evaluating the data to identify ones of a plurality of different frame types contained therein; and applying different quality-of-service (QoS) policies to respective ones of the different frame types; and receiving consideration from the user for at least one of the providing and enabling.

In one variant, the multimedia capable device comprises a 3G-capable smartphone, and the wireless network comprises a 3G cellular network.

In another variant, the evaluating the data comprises reading at least one hint track associated with the multimedia data to identify at least one frame tag disposed therein.

In another embodiment, the method of doing business comprises: providing a user a multimedia capable device, the device comprising a wireless interface adapted to communicate multimedia data over a wireless network; enabling the device to transmit the multimedia data, the transmission comprising: evaluating the data to identify ones of a plurality of different frame types contained therein; and applying different forward error correction encodings to respective ones of the different frame types; and receiving consideration from the user for at least one of the providing and enabling.

In one variant, the different encodings are selected for respective ones of the different frame types based at least in part on prevailing conditions within an access medium of the wireless network.

In an eighth aspect of the invention, a method of doing business is disclosed. In one embodiment, the method comprises: providing a user a multimedia capable device, the device comprising a wireless interface adapted to communicate multimedia data over a wireless network; enabling the device to transmit to an access network a set of classification rules for data packets subsequently received from the radio access network, each of said classification rules associated with a QoS and/or error correction encoding policy of the radio access network. Subsequent transmissions from the radio access network to said device comprising: evaluating at the radio access network, data packets received from an application server, to identify ones of a plurality of different application-layer frame types contained therein; and applying different quality-of-service (QoS) policies to respective ones of the different frame types; and receiving consideration from the user for at least one of the providing and enabling.

BRIEF DESCRIPTION OF THE DRAWINGS

FIG. 2b is a table illustrating an implementation of a hint track according to one embodiment of the present invention.

FIG. 3 is a functional block diagram illustrating the process of forward error correction encoding and packetizing according to one embodiment of the present invention.

DETAILED DESCRIPTION OF THE INVENTION

Figure 1:
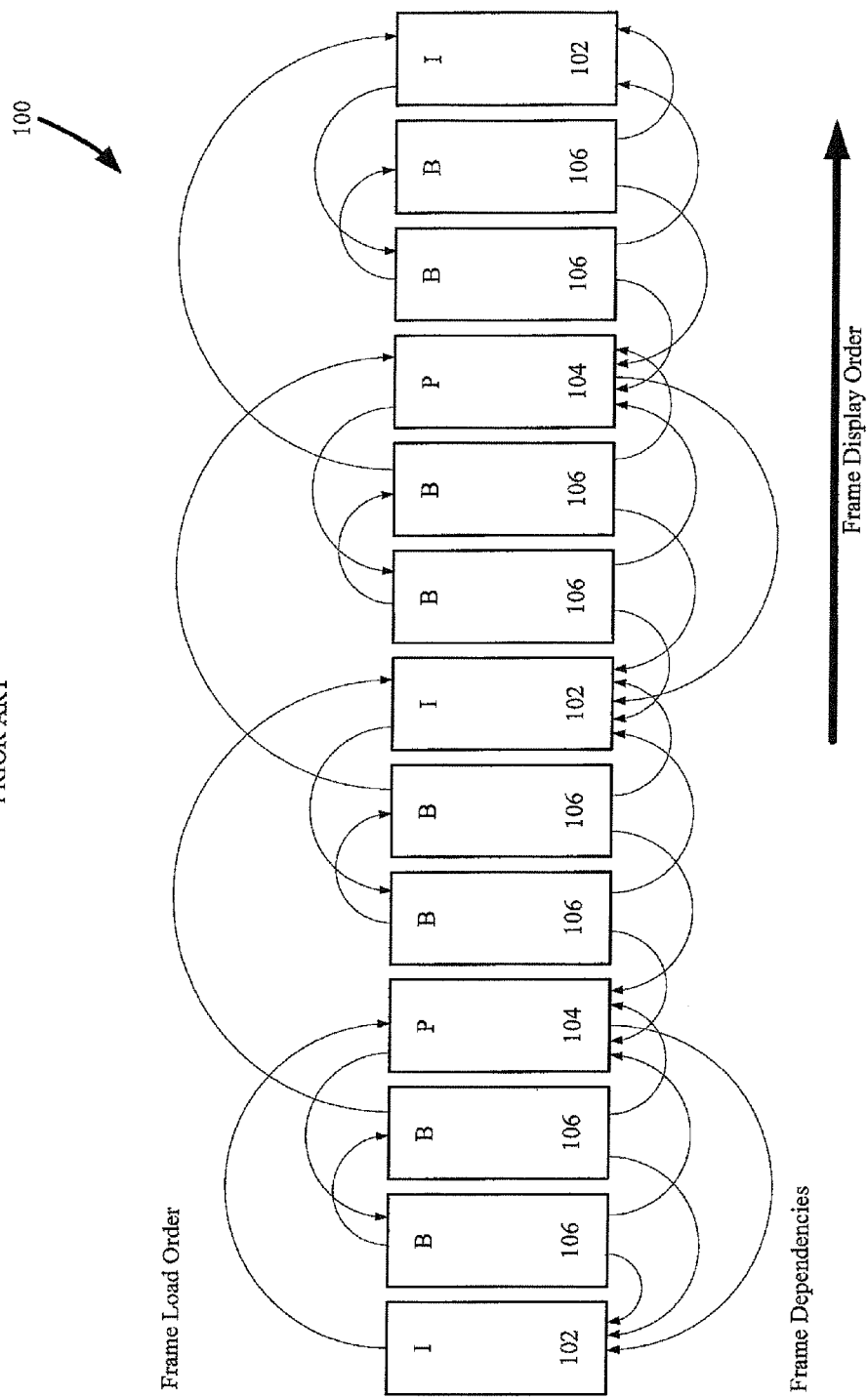
FIG. 1 is a MPEG data stream that illustrates the frame dependencies between I-frames, B-frames and P-frames.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ or J2ME environment.

As used herein, the term "capacity" refers to, without limitation, the ability of a network, portion of a communication channel, network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as errors or delays imposed by transmission, filtering, transcoding, encryption/decryption, and so forth.

As used herein, the term "cellular" refers without limitation to any wireless telecommunications (and/or data) apparatus or system providing multiple user access including for example those of the 2G, 2.5G, and 3G families. Well known cellular standards and technologies include e.g., UMTS, GSM, 3GPP/WCDMA, 3GPP2 (CDMA2000), IS-95, IS-136, IS-54, LTE, 802.16 (WiMAX), and PCS-1900.

As used herein, the terms "client device" and "end user device" include, but are not limited to, set-top boxes (e.g., DSTBs), DSL modems, personal computers (PCs), and minicomputers, whether desktop, laptop, or otherwise, and mobile devices such as handheld computers, PDAs, personal media devices (PMDs) such as the exemplary iPod™ media device manufactured by the Assignee hereof, and smartphones such as the exemplary iPhone™ multi-function media and telephony device manufactured by the Assignee hereof.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein the term "hint track" refers without limitation data which provides ancillary information regarding some aspect of media or other primary content being transmitted; e.g., how to transmit that media or content over a transmission channel. Exemplary embodiments of hint tracks are described for example in co-owned U.S. Pat. No. 6,744,763 to Jones, et al entitled "Method and apparatus for media data transmission" issued Jun. 1, 2004 and incorporated herein by reference in its entirety.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "metadata" comprises without limitation extra data not typically found in typical primary content (or at least not visible or audible to the users of the network). This metadata can be provided with the content from its source or provider, or alternatively added by the transmission device (e.g., cellular telephone or base station) or the network operator. Metadata is typically packaged in a prescribed format (e.g., XML) and may optionally be made human-readable. Alternatively, non-human readable data can be used, such as where the metadata is encoded in hexadecimal or binary, or any other number of different coding schemes.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network", "access network", and "bearer network" refer generally to any type of telecommunications or data network including, without limitation, cellular networks, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in a server belonging to a network operator, which is in communication with one or more processes on a Customer Premises Equipment (CPE) or other device.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, WiFi (802.11a,b,g,n), WiMAX (802.16), LTE, PAN (802.15), cellular, or IrDA families.

As used herein, the terms "radio access network" or "RAN" refer generally to any wireless network including, without limitation, those complying with the 3GPP, 3GPP2, GSM, IS-95, IS-54/136, IEEE Std. 802.11, Bluetooth, Long Term Evolution (LTE), WiMAX, IrdA, or Personal Area Network (PAN) (e.g., IEEE Std. 802.15) standards. Such radio networks may utilize literally any air interface, modulation technique or radio access scheme, including without limitation DSSS, WCDMA, TDMA, FHSS, OFDM, OFDMA, TD-SCDMA, FDMA, or any combinations or variations thereof including any linear or non-linear transform of RF signals using data to be transmitted.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, 4G, HSDPA/HSUPA, TDMA, CDMA (e.g., IS-95A, WCDMA, etc.), LTE, FHSS, DSSS, GSM, PAN/802.15, WiMAX (802.16), 802.20, narrowband/FDMA, OFDM, PCS/DCS, CPDP, satellite systems, millimeter wave or microwave systems, acoustic, and infrared (i.e., IrDA).

Overview

In one salient aspect, the present invention provides for a separate or individualized treatment of data packets within the same data stream so as to enhance link efficiency and QoS/FEC implementation. In one embodiment, such individualized treatment is based on packet type or frame type. The treatment applied to each packet or class/type of packet may relate to Quality-of-service (QoS) characteristics (for example, aspects of a connection, time to provide service, quality, echo, loss, reliability, etc.), and/or it may relate to differentiated forward error correction protocols (for example, varying levels of forward error correction).

Exemplary embodiments of the present invention accomplish the foregoing functions by working in conjunction with the pre-existing physical layer (PHY) of a network protocol and/or the medium access control (MAC) layer, although other layers may also be utilized in addition to (or in lieu of) the PHY and MAC layers.

In one exemplary embodiment, an application executing on an application layer server designates its application layer packet payloads according to selected QoS and/or error correction encoding schemes. The application layer embeds the selected QoS and/or error correction schemes within a "tag". This tag is communicated transparently over the interact backbone network to an access network, such as a radio access network (cellular, WiFi, etc.), a Digital Subscriber Line (DSL) network, or a cable network.

The access network is responsible for parsing each packet for the application layer designation, and directly utilizing the tag designation (as determined by the application) for the access network's internal QoS and/or error correction policies. The access network then enforces the "application" policy when the packet is communicated to a destination device (the destination device is directly connected to the access network). In this manner, the access network enables direct control by the source application over the QoS and/or error correction policies that are implemented in the access network, for each of the access network packets.

In one embodiment, frame tags are utilized so as to indicate a particular quality-of-service policy or profile assigned to each packet. A physical or logical processing function may then be used by the recipient node in order to select the appropriate packet handling logic for the packet as indicated by the frame tag. In alternative embodiments, a forward error correction (FEC) mode is also stored within each frame tag along with or instead of a QoS indicator. This FEC mode is utilized by a recipient node in order to provide appropriate FEC decoding to each packet, where such decoding does not depend on the packet's particular QoS assignment. In this manner, error correction can be advantageously separated from QoS treatment so as to provide a more flexible and efficient data transmission system. In alternate embodiments, however, invocation of a particular QoS class or FEC type automatically invokes a corresponding FEC type or QoS class, respectively (e.g., QoS/FEC "pairs").

In one alternate embodiment, the designation frame tags do not map directly to a QoS and/or error correction policy. Instead the frame tag may designate a minimum requirement for QoS (as QoS below the minimum requirement would be unsatisfactory for correct operation), or a maximal requirement for error correction (as error correction techniques above a maximum required error correction do not give additional robustness).

In another variant, the designation frame tags may be "in operation" for a set period of time or matched to a number of frames within a stream. Such operation is beneficial in applications which do not change QoS and/or error correction schemes frequently.

In one specific example, a media server controlled by a content provider can directly control the QoS policy enforced in a 3G cellular base station for data frames. The media server designates the QoS policy for each individual I-frame, P-frame, or B-frame within an MPEG stream. By providing the media server (as opposed to the access network) with methods and apparatus to tailor treatment of packets within a given transmission stream, expensive packet processing operations can be reduced and/or eliminated, thus preserving computational resources at both the sending and the receiving nodes. Efficiency gains may also be realized over the network since less data is necessary in order to accomplish content transfer (including for example obviating retransmission of data). This results in reduced transfer times for media streams and less congestion over the transmission network. Additionally, by allowing the application to dynamically modify the QoS provisioning based on its current state, a more efficient utilization of the access network downlink bandwidth is possible. Lastly, the access network does not have to maintain large sets of packet classification rules in order to identify all the possible QoS configurations for all possible application streams. Instead, each application is allowed to fine tune its QoS requirements at the packet type level.

As previously noted, prior art methods are also inefficient because each type of access network (e.g. Wi-Fi, LTE, or WiMAX) can potentially have its own unique set of QoS policy parameters, that could translate the same packet into a slightly different access network QoS policy, having undesirable results as the mobile device roams from one access network to another. The present invention addresses this problem because the QoS policy is defined by the source application, and therefore can be consistently enforced by a variety of access networks.

Exemplary integrated circuit embodiments, as well as mobile devices and base stations, are described herein as well. Business methods relating to the foregoing techniques are also described.

Detailed Description of Exemplary Embodiments

Exemplary embodiments of the apparatus and methods of the present invention are now described in detail. It will be appreciated that while these exemplary embodiments are described primarily in the context of a 3G cellular infrastructure and a Cellular Service Provider (CSP) having digital networking capability and a plurality of mobile communication devices (MDs), the general principles and advantages of the invention may be extended to other types of networks and architectures, whether wired or wireless, broadband, narrowband, or otherwise, the following descriptions therefore being merely exemplary in nature. For example, these techniques could be employed in the context of a WiFi network, LTE network, WiMAX network, metropolitan area network, (MAN), or personal area network (PAN).

It will also be recognized that while described generally in the context of a network providing service to a customer (i.e., cellular telephone user) end user domain, the present invention may be readily adapted to other types of environments including, e.g., commercial/enterprise, and government/military applications. For example, the network might comprise an enterprise intranet communicating between various corporate campuses.

Also, it is noted that the various systems that make up the invention are typically implemented using software running on semiconductor-based microprocessors or other computer hardware systems, the construction and operation of which is well known in the art. Similarly, the various logical processes and algorithms described here are also typically performed by software running on a microprocessor, although other implementations, including firmware, hardware, and even human performed steps are consistent with the invention.

Figure 2:
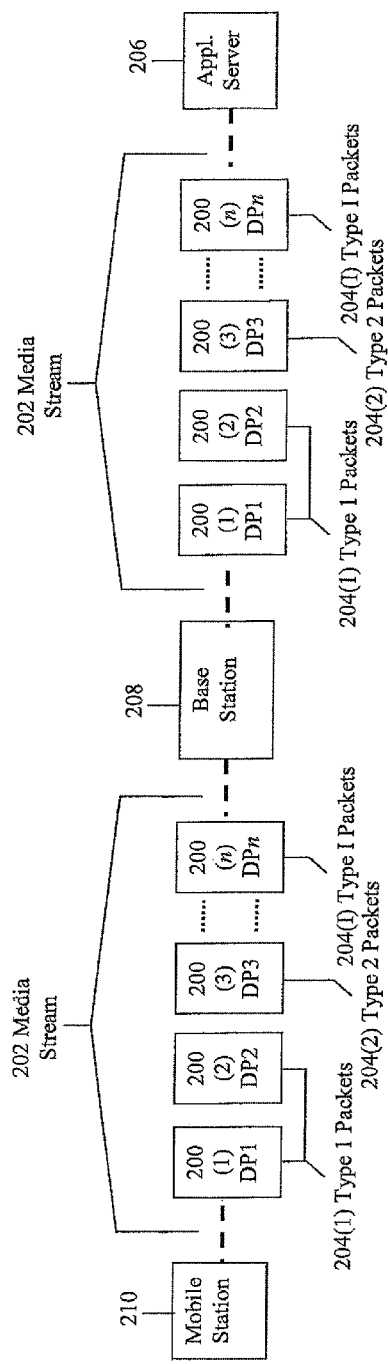
FIG. 2 is a generalized diagram of a three node communications system in the prior art.

As previously described with respect to FIG. 2, the prior art packet transmission scheme selects an appropriate transmission mode for all data packets 200 in the media stream 202. This mode is usually selected based upon what is necessary for the base station 208 to accommodate the highest QoS necessary for any individual packet within the stream. The mode selected may also turn upon the most expansive error correction protocol necessary to reasonably accommodate the transmission of any individual packet within the media stream. Common logic is used in order to process each data packet arriving at the mobile station 210. This approach is inefficient in the sense that certain packet types need not require the same error correction/quality-of-service provisioning necessary for other packets types. Providing such provisioning for these packet types often unnecessarily increases the number of bytes necessary for transmitting the entire media stream, while selecting a less stringent transmission mode for the media stream in order to increase transfer speed usually requires sacrifices in QoS. Similarly, use of an error correction protocol with less redundancy often requires retransmission of all or part of the media stream which may result in loss of efficiency.

Figure 2A:
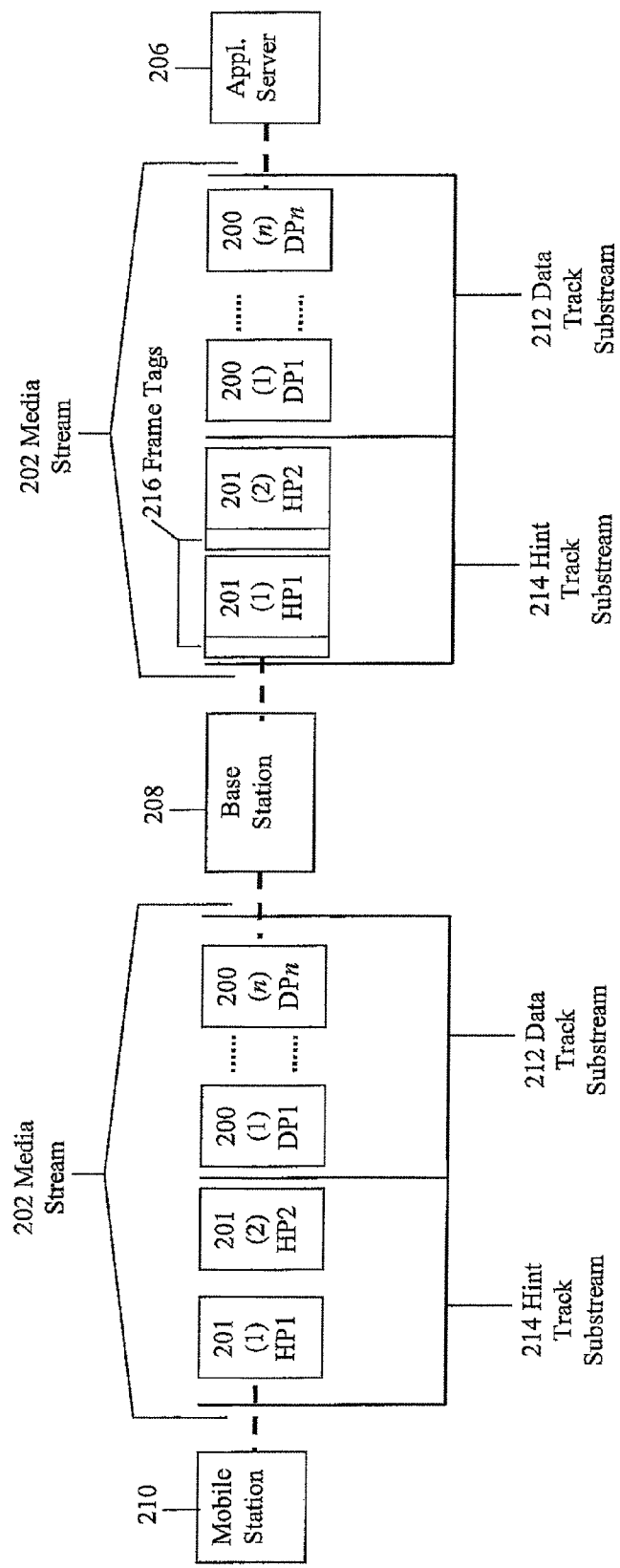
FIG. 2a is an exemplary diagram of a three node communications system utilizing application layer frame tags for transmission control, according to the present invention.

FIG. 2a is a block diagram illustrating a transmission stream sequence according to a first exemplary embodiment of the present invention. As shown in FIG. 2a, a media stream 202 is transmitted between an application server 206 and an access network 208 (e.g. base station), which is serving a mobile station 210. The media stream 202 further comprises a "hint track" substream 214 and a data track substream 212. The data track substream 212 comprises a plurality of data packets 200(1)-200(n) containing the actual media content of the stream targeted for transmission.

The hint track substream 214 comprises information and/or metadata associated with each packet in data track substream 212. According to one variant, data comprised within the hint track substream 214 comprises information about how the media data in data track substream 212 was packetized including for example, hint tracks in a QuickTime™ movie stream (see, e.g., U.S. Pat. Nos. 6,717,952; 6,134,243; 6,453,355; 6,512,778; 6,714,984; 6,744,763; and 6,829,648, each of the foregoing incorporated herein by reference in their entirety. In the exemplary QuickTime context, hint tracks describe how to packetize media data. For instance, as described in U.S. Pat. No. 6,829,648, hint tracks may be included in the transmitted stream. Each hint track sample can describe how to packetize an RTP packet by pointing to media data in a video track. In addition, for RIP packets, a 32-bit number indicating the RTP timescale is included in the hint track, in addition to a 32-bit number indicating the random offset to add to the stored timestamp in the data track, as well as a 16-bit number indicating a random offset to add to the sequence number. Also the chosen packet size for RTP packets is indicated in the sample description for the hint track.

As shown, the "hint track" is supplemented by frame tags 216, to enforce application layer QoS and/or error correction policies, One way of implementing the frame tags 216 is logically illustrated in the block diagram presented in FIG. 2b. As the figure illustrates, the metadata used to aid in the processing of each packet in the data track substream 212 is provided a separate entry within the hint track 214 (these entries are known as the frame tags 216(1)-216(n)). One packet identifier 218(1)-218(n) is used to distinguish each particular packet 200(1)-200(n) from other packets in the data track substream. According to one embodiment, each packet identifier 218 can be represented as a unique alpha-numeric identifier that is part of a calculable sequence. Other approaches may be used as well.

Associated with each packet 200 is a QoS class 220. The QoS class 220 provides an indication to an access network 208 regarding which QoS standard to employ for a particular packet 200. Thus, as illustrated by FIG. 2b, Packets 1, 3, 9, 10, 12, and n are each provided the same QoS treatment (designated by QoS class 13), while a separate QoS standard applies to Packets 2, 4, 11, and 13 (QoS class 8). In this manner, a different QoS standard can be assigned for each packet type. It will be recognized that the aforementioned class designations and representations are only illustrative; various other types and naming conventions for classes may be employed consistent with the invention.

According to some embodiments, the QoS class 220 assigned to each data packet 200 is determined by QoS-packet assignment logic. This logic may be physically rendered as a computer algorithm (program) or even as firmware or hardware. The assignment logic is resident on the application server; however, the logic may obtain capability data from the intended mobile station 210 or base station 208 as part of the assignment process, such as via a capabilities message or other signaling protocol. Using the capability data, the application server can create alternative assignments in the event that either the mobile or base station does not possess sufficient logic for handling all or a portion of a particular QoS class 220. This flexibility advantageously allows greater interoperability between any application server and receiver/transmitter which have separate physical and/or functional characteristics.

In the embodiment depicted by FIG. 2b, only one QoS class field 220 has been provided for each frame tag 216. However, according other variants, multiple QoS class fields are utilized. Having multiple QoS fields allows for a layered selection of logical modules (e.g., functional algorithms or routines within a protocol stack), thus providing further efficiencies in the data transmission process. For example, a first set of logical modules may be dedicated to reliability or error mitigation, a second set of modules may be dedicated to audio or video quality or resolution, while a third set of modules may be dedicated timing issues/jitter. The product of the quantity of each set yields the number of possible permutations available in the data transmission system. Efficiency gains in data transmission may be said to functionally depend at least to some degree upon the amount of variance in packet types within a given media stream 202 and the number of permutations allowable in a given design. Such factors will be evident to the designer of ordinary skill, and hence are not described further herein.

Referring again to the embodiment depicted by FIG. 2b, each packet 200 also comprises an associated FEC mode 222. As previously described, forward error correction (FEC) is a system of error control for data transmission, whereby the base station 208 adds redundant data to its messages in the form of a systematic or non-systematic error correction code. This approach allows the mobile station 210 to detect and correct errors without the need to ask the base station for additional data (such as retransmission). One salient advantage of forward error correction is that retransmission of data can often be avoided (thereby obviating associated higher bandwidth requirements). It will be appreciated that literally any type of error correction coding scheme may be used consistent with the present invention including without limitation turbo codes, convolutional codes, block codes, and LDPCs.

Figure 2C:
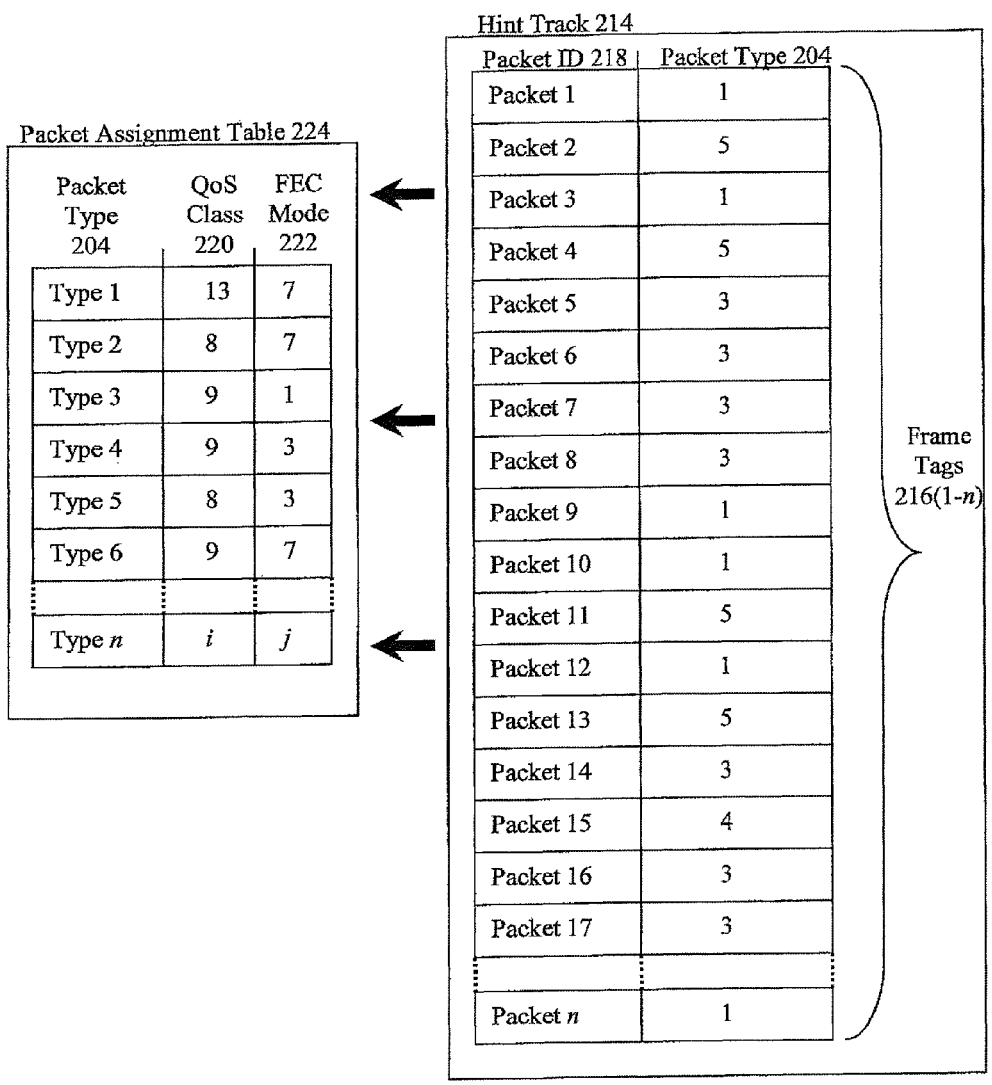
FIG. 2c is a set of tables illustrating an implementation of a hint track according to another embodiment of the present invention.

FIG. 2c is a block diagram illustrating the aforementioned hint track 214 according to a second embodiment of the invention. Instead of providing the specific QoS Class 220 and FEC Mode 222 as part of the hint track substream 214, a packet type indicator 204 is alternatively utilized. The indicated packet type 204 comprises metadata corresponding to one specific QoS Class 220-FEC Mode 222 permutation. For example, QoS Class 220 "8" and FEC Mode 222 "3" correspond with packet type 204 "5", while QoS Class 220 "9" and FEC Mode 222 "1" correspond with packet type 204 "3". This information is stored within a packet assignment table 224 or codebook which can be locally searched by the base station 208 upon receipt of a transmitted media stream 202 in order to determine the appropriate QoS and FEC switching or processing logic for each particular packet. One advantage of this approach is that embodiments comprising multiple categories for QoS and/or FEC will require only one transmitted packet type indicator for each frame tag 216(1–n), as opposed to separate indicators for each QoS/FEC category.

Based on certain characteristics of a packet (for example, a given packet's time-sensitivity), it may be important that the packet reach the recipient node immediately, accurately (i.e., without bit errors), and without requiring a retransmission. A more robust or extensive FEC may be utilized in order to accomplish one or more of these purposes. For other packets (for example, packets transmitted asynchronously or those which are part of a "lossy" channel), less robust or no FEC may be preferred instead. This could also be the case, for example, when the efficiency gains realized by not transmitting redundant data associated with the FEC exceed the attendant costs of retransmission when uncorrectable errors occur.

Thus, according to one exemplary embodiment, the frame tags 216 also comprise an assigned FEC mode 222 which indicates the level and/or type of FEC applied to a given packet 200. Having a plurality of possible FEC modes 222 advantageously allows each packet or packet type to be provided with specifically-tailored FEC treatment. As with the packet's indicated QoS class 220, a selectable FEC mode 222 promotes efficiency in the sense that it minimizes the transfer of unnecessary data or data with only a marginal utility.

Thus, one exemplary embodiment of the present invention comprises a technique for dynamic cross-layer processing. Each frame type has a corresponding QoS profile. The frame tags supplied in the hint track of the media stream by the application server also indicates which QoS class should be employed for the corresponding media packet when transmitted by the transmitter (e.g. access network). The MAC-layer QoS entity of an access network base station must process these tags for the purpose of assigning the packet to the correct QoS class.

Figure 2D:
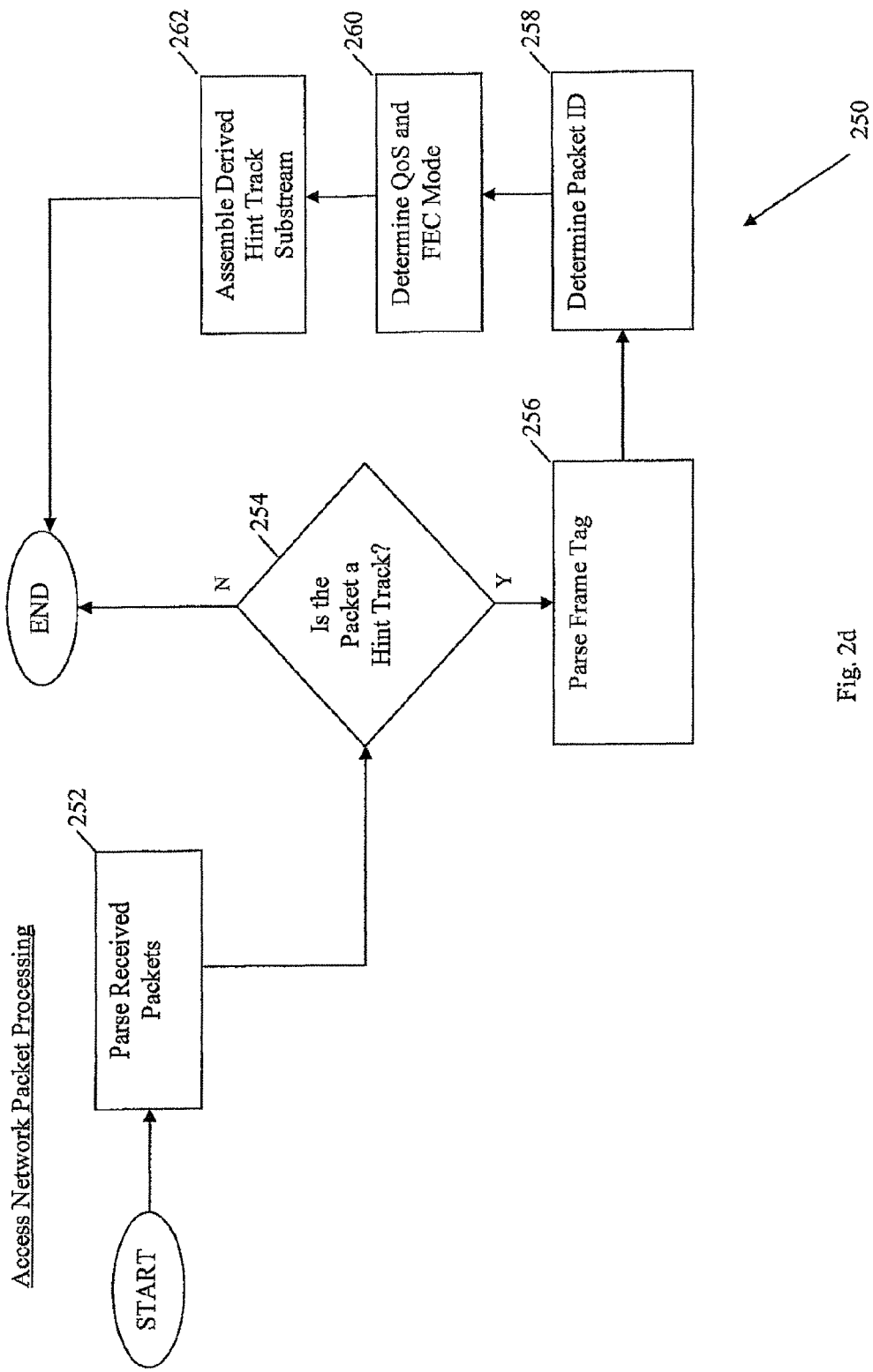
FIG. 2d is flow chart illustrating access network packet processing according to one embodiment of the present invention

Referring to FIG. 2d, an exemplary packet processing method 250 as implemented within the access network 208 is described. The access network receives a media stream 202 comprised of hint track substreams 214, and data track substreams 212. The access network determines if each packet is a data packet, or a hint track packet 252. If the packet is a Hint Track 254, the access network parses the hint track for frame tags 256. Each frame tag is parsed for packet IDs 258, and corresponding QoS and/or FEC modes 260. The parsed information is used by the access network to identify the internal access network QoS and FEC policy to apply to each data track packet that is subsequently received 262.

Analogously, certain embodiments of the present invention seek to enhance the forward error correction performance of broadband access networks by selecting the appropriate FEC encoder/decoder pair based on frame tags supplied in the multimedia stream. Frame tags are supplied in the derived hint track substream of the media stream to indicate which encoder/decoder pair should be employed for the corresponding media packet Any heterogeneous or homogeneous plurality of encoder/decoder pairs is allowed. Thus, for example, the plurality can be formed from turbo encoder/decoder pairs only, or through a combination of turbo, convolutional, trellis, and LDPC encoder/decoder pairs. This allows the application server the freedom to pick the correct encoder/decoder pair for the multimedia packet type.

The physical-layer FEC encoder entity of an access network base station 208 processes these tags for the purpose of assigning the packet to the FEC encoder prior to packet transmission by its transceiver. If fragmentation has occurred at the link layer, the fragmentation entity in the link layer is responsible for copying the tag associated with the packet to each of its fragments. The tags are further included in the frame header for all frames transmitted across the access medium associated with the original multimedia packet.

The physical-layer FEC decoder entity of the mobile station 210 processes these tags for the purpose of assigning the packet to the correct FEC decoder after packet reception by a transceiver. The tags are represented by an enumerated field. Each value in this field corresponds to a QoS and FEC provisioning that is specific to the multimedia stream 202. This provisioning is determined by the application server 206, based on the multimedia data type (such as MPEG frames) prior to the transmission of multimedia packets; and may include additional provisions for transmitter (e.g. base station) and receiver (e.g. mobile station) capabilities.

FIG. 3 is a diagram illustrating the process of encoding and packetizing a data stream according to one embodiment of the present invention. An unencoded data stream 302 is provided as input to a physical layer FEC encoder entity 304 comprised within the transmitting PHY 300. For the purposes of this discussion, it is assumed that "unencoded" refers to channel coding applied at the PHY layer; in actuality, however, the data stream 302 may have already been encoded one or more times by logic existing apart from the PHY layer).

According to the variant depicted by FIG. 3, the physical layer FEC encoder entity 304 also receives information dictating FEC encoding from the hint track substream 214 as input, in addition to the received unencoded data stream 302. The data comprised within the hint track, according to this variant, provides the physical layer FEC encoder entity 304 with information pertaining to how to encode the unencoded data stream 302, via frame tag information 216. The physical layer FEC encoder entity 304 retrieves the FEC mode 222 associated with each data packet 200 using the packet ID of the hint track and then routes each data packet 200 to a plurality of encoders 306(1)-306(n) resident on the transmitting PHY 300 (note that each encoder 306 corresponds in the illustrated embodiment to one or more selectable FEC modes 222, although this is not a requirement of the invention). The newly encoded data packets are combined with the original hint track to create a media stream, for transport across the access network's radio interface.

The resulting media stream may resemble the media stream 202 illustrated in FIG. 2a. However, in alternative embodiments, the frame tags may or may not be present within the newly constructed media stream 202, as they are ignored at the receiving mobile station 210.

The access network has at least one FEC encoder/decoder combination that is allowed. The media server is able to select one combination from this plurality and specify it within the frame tag. The access network, upon receiving the frame tag, will "process" subsequent media data by executing the proper FEC encoder algorithm. Furthermore, the access network will signal to the destination device the selected FEC encoder so that it can "process" the received packets over the radio downlink by executing the proper FEC decoder.

Figure 4:
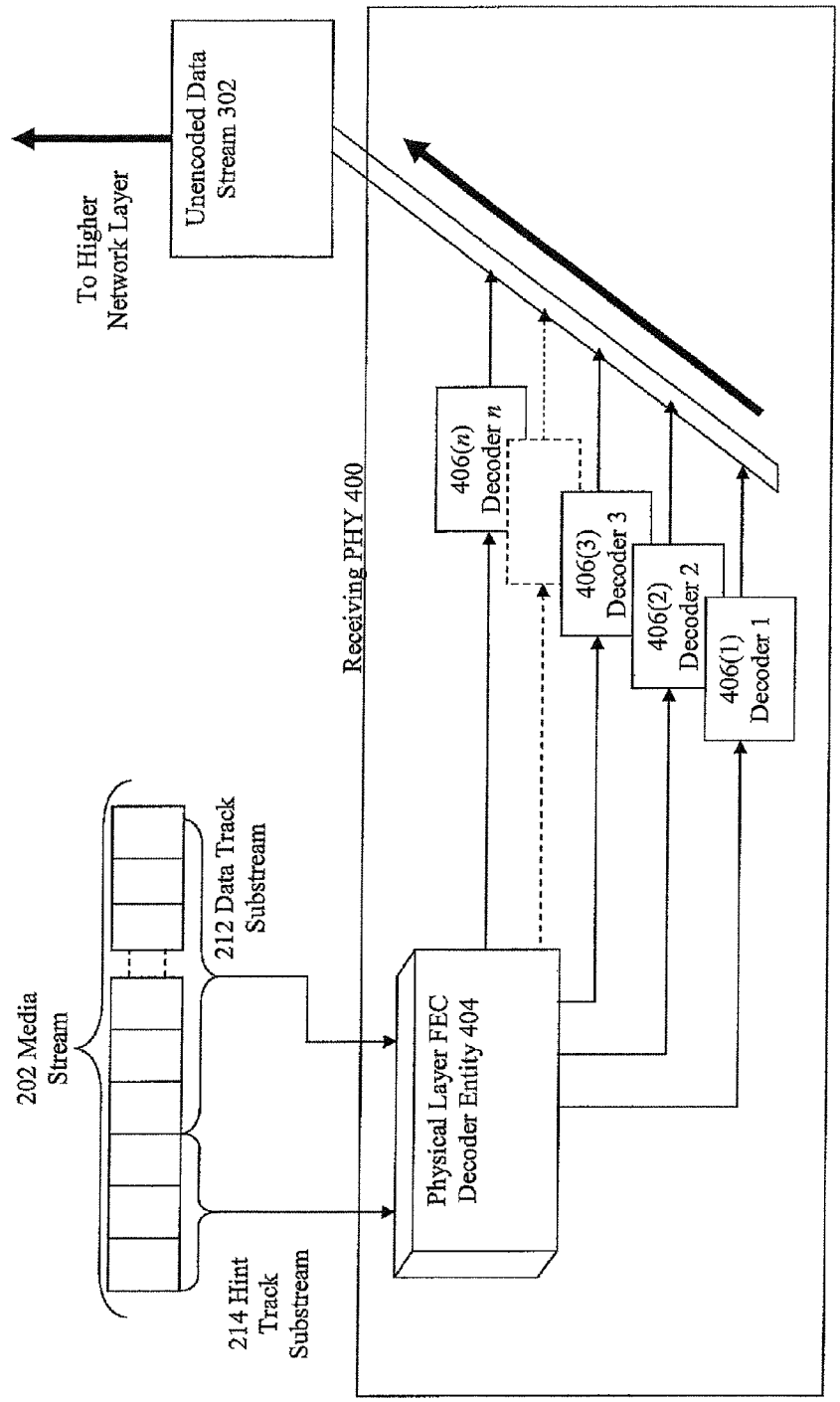
FIG. 4 is a functional block diagram illustrating a process of forward error correction decoding applied to an encoded media stream received at a physical layer.

FIG. 4 is a diagram illustrating the process of decoding the data and traffic channels within a receiving PHY 400 (located at the mobile station 210). The received media stream 202 comprises original data tracks 212 and hint tracks 214. The Physical Layer FEC decoder entity 404 routes the media stream to an appropriate decoder 406(1)-406(n). The data packets (e.g. original data tracks, and hint tracks) are then decoded and subsequently transmitted to a higher layer of the selected network protocol. The application layer control over FEC is transparent to the physical layer FEC decoder entity, as the decoder has been "signaled" by the access network, thus it does not require the frame tags to decode the media stream.

Figure 5:
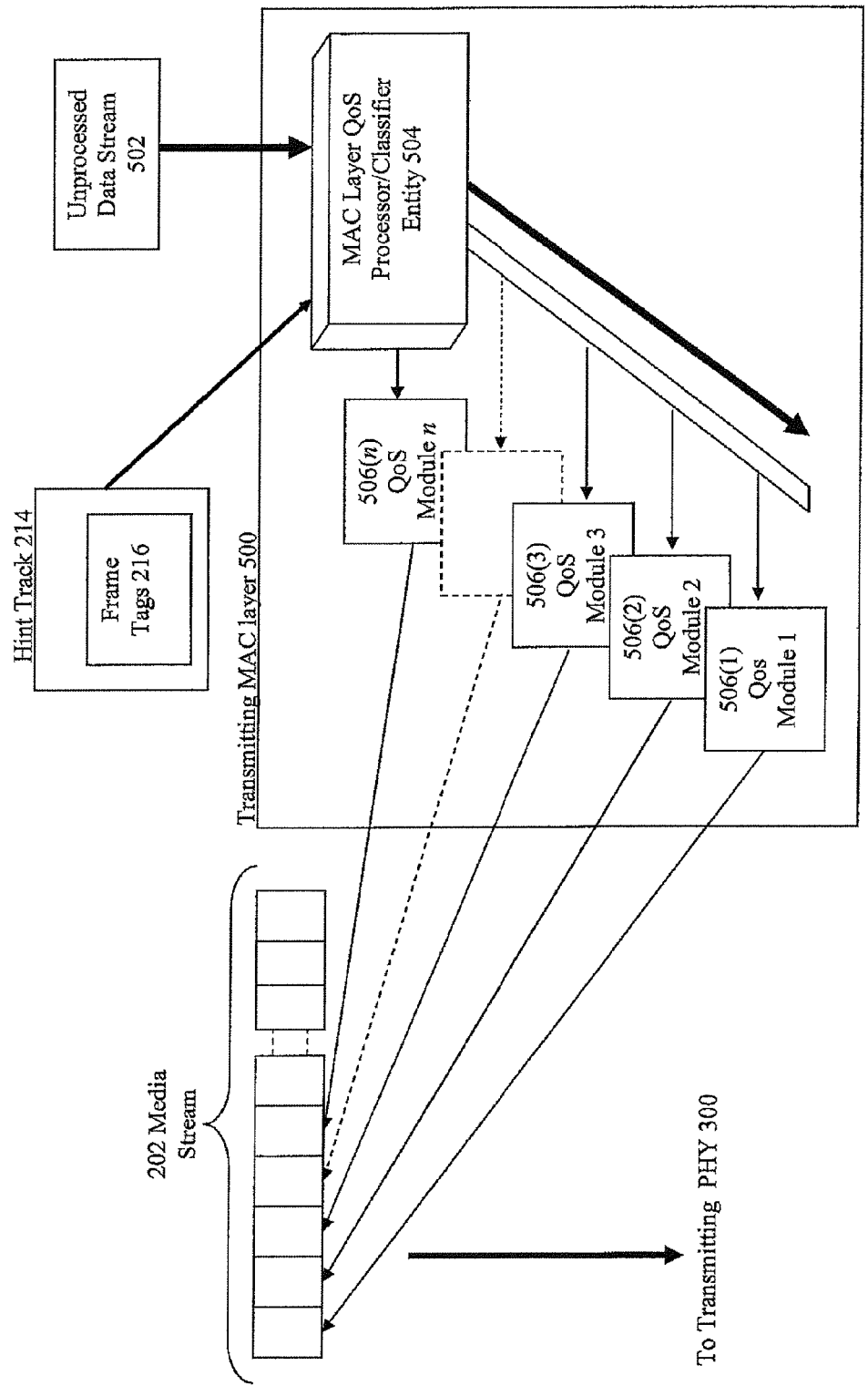
FIG. 5 is a functional block diagram illustrating a process of quality-of-service (QoS) encoding according to one embodiment of the present invention.

FIG. 5 is a block diagram illustrating an analogous process of QoS provisioning at the MAC layer 500 of a network protocol. An unprocessed data stream 502 is provided as input to a MAC layer QoS processing entity 504 comprised within the transmitting MAC layer 500. For the purposes of this discussion, it is assumed that "unprocessed" refers to data processing or coding applied at the MAC layer; in reality, however, the data stream 502 may have already been processed or encoded one or more times for various purposes (e.g., error correction, etc.) by logic existing outside of the MAC layer.

A Quality-of-Service profile is a "predefined set of QoS-related service flow parameters." Exemplary QoS profiles are: UGS (unsolicited grant service), RT-VR (real-time variable-rate service), NRT-VR (non-real-time variable rate service), BE (best effort service), and ERT-VR (extended real-time variable rate service). The mobile station 210 does not have any QoS processing functions to perform for prioritization, since it can receive packets in any order. However, QoS scheduling requires the mobile station 210 to synchronize with the QoS schedule that the base station 208 is using to transmit packets. A QoS schedule is often used for fixed rate traffic, such as voice traffic.

Another aspect of QoS processing in the base station relates to "traffic shaping". This aspect of QoS processing examines the minimum and maximum traffic rates, latency, and tolerated jitter of each QoS class. The base station must constrain its transmission schedules around QoS requirements. None of the QoS scheduling processing has a corollary in the mobile station, as the mobile station is effectively a slave to the base stations QoS schedule.

According to the variant depicted by FIG. 5, the MAC layer QoS processing entity 504 receives information dictating QoS requirements within the hint track 214 as input in addition to the received unprocessed data stream 502. The data comprised within the hint track 214, according to this variant, provides the MAC layer QoS processing entity 504 with information pertaining to how to process or apply the QoS profile(s) to the unprocessed data stream 502, via frame tag information 216. The MAC layer QoS processing entity 504 retrieves the QoS Class 220 associated with each packet in the frame tags 216 of the hint track 214 and routes each data packet 200 to a plurality of QoS processing modules 506(1)-506(n) resident on the transmitting MAC layer 500, such that each QoS module 506 corresponds to one or more selectable QoS classes or profiles (policies) 220. The newly scheduled data packets are combined with the original hint track to create a media stream, for transport across the access network's radio interface.

The resulting media stream may resemble the media stream 202 illustrated in FIG. 2*a*. However, in alternative embodiments, the frame tags may or may not be present within the newly constructed media stream 202, as they are ignored at the receiving mobile station 210.

As depicted in FIG. 5, the content is processed by a plurality of QoS Modules 506(1)-506(*n*) according to one or more relevant QoS profiles, and the hint track 214 is packetized and placed inside the media stream 502 along with the processed data packets for transmission to the PRY layer 300.

Figure 6:
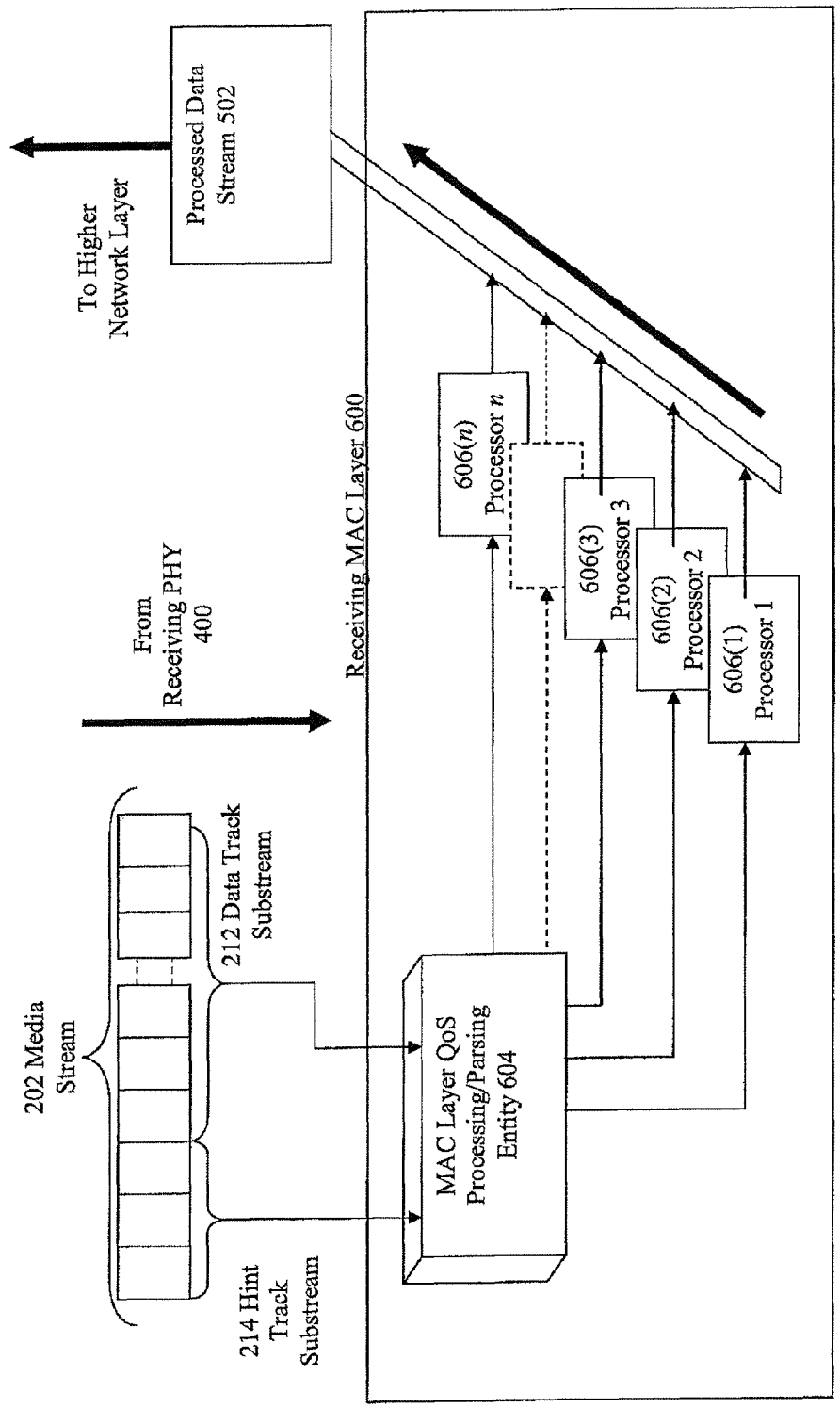
FIG. 6 is a functional block diagram illustrating a process of quality-of-service decoding applied to an encoded media stream received at a media access control layer according to one embodiment of the invention.

FIG. 6 is a block diagram graphically illustrating an exemplary process of QoS processing a media stream 202 received by a receiving MAC layer 400. According to one embodiment of the present invention, the media stream 502 comprises a hint track substream 510 and a data track substream 512 (such as that shown in FIG. 2*a*). The hint track substream 510 comprises information corresponding to hint track 214, and is adapted to be processed at the receiving MAC layer 600, The frame tags 216 comprised within the hint track 214 indicate to the receiving MAC layer 600 the specific QoS class 220 used for processing/routing each data packet 100. Upon reading the designated QoS class 220 for each packet 200 as written in the frame tags 216, the MAC Layer QoS processor and parsing entity 604 then routes the packet to an appropriate processing module 606(1)-606(*n*). The packets 200 are then processed as required and subsequently transmitted to a higher layer of the selected network protocol.

Figure 7:
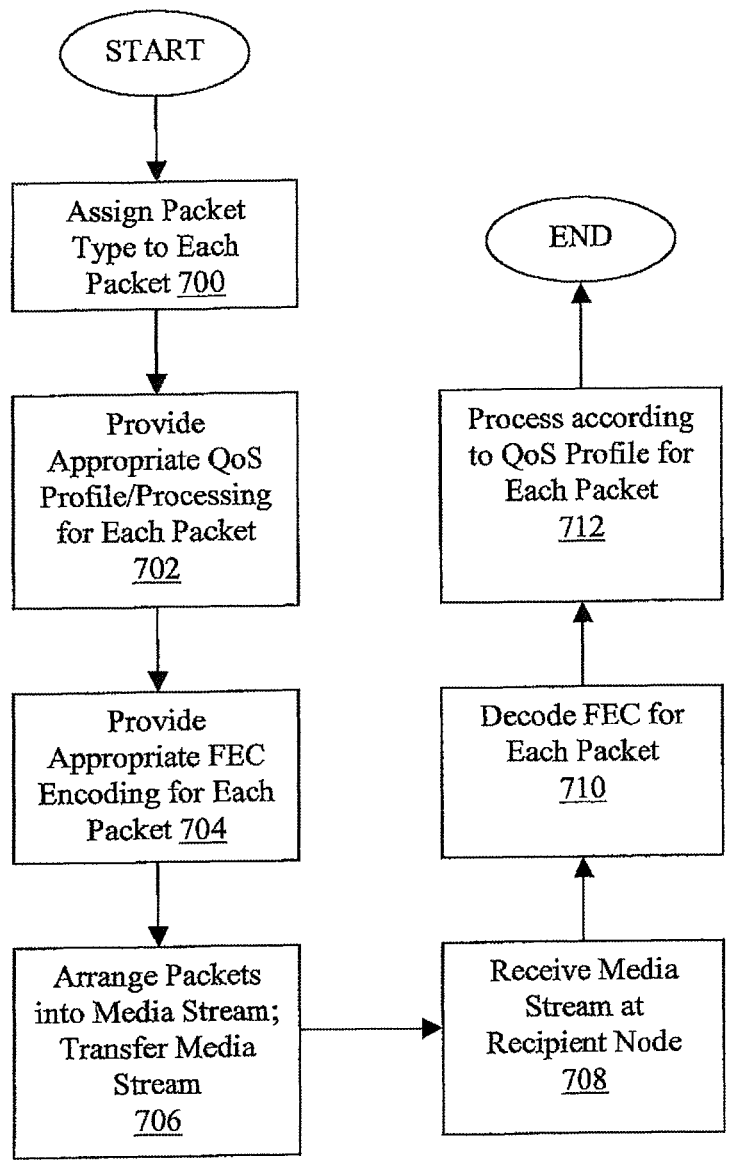
FIG. 7 is a logical flow diagram illustrating a high-level method of accomplishing quality-of-service/forward error correction provisioning according to one embodiment of the present invention.

FIG. 7 is a high-level flow diagram illustrating a method of accomplishing QoS/FEC provisioning according to another embodiment of the present invention. At step 700, each data packet is assigned a particular packet type depending on factors such as e.g., the function or use of the packet, its priority, type of media stream in which it is used, minimum and maximum traffic rates, latency, tolerated jitter, and transmitter scheduling, etc. At step 702, QoS processing according to the relevant QoS profile is performed on each packet according to the selected packet type as required. Similarly, at step 704, FEC encoding is performed according to packet type. The packets are subsequently arranged into a media stream and transferred to a recipient node at step 706. After the recipient node receives the transmitted media stream at step 708, FEC decoding occurs at step 710 followed by QoS processing (if required) at step 712. Note that in alternative embodiments, packet types are assigned (step 700) after QoS processing and/or FEC encoding have already been performed (steps 702 and 704).

Figure 8:
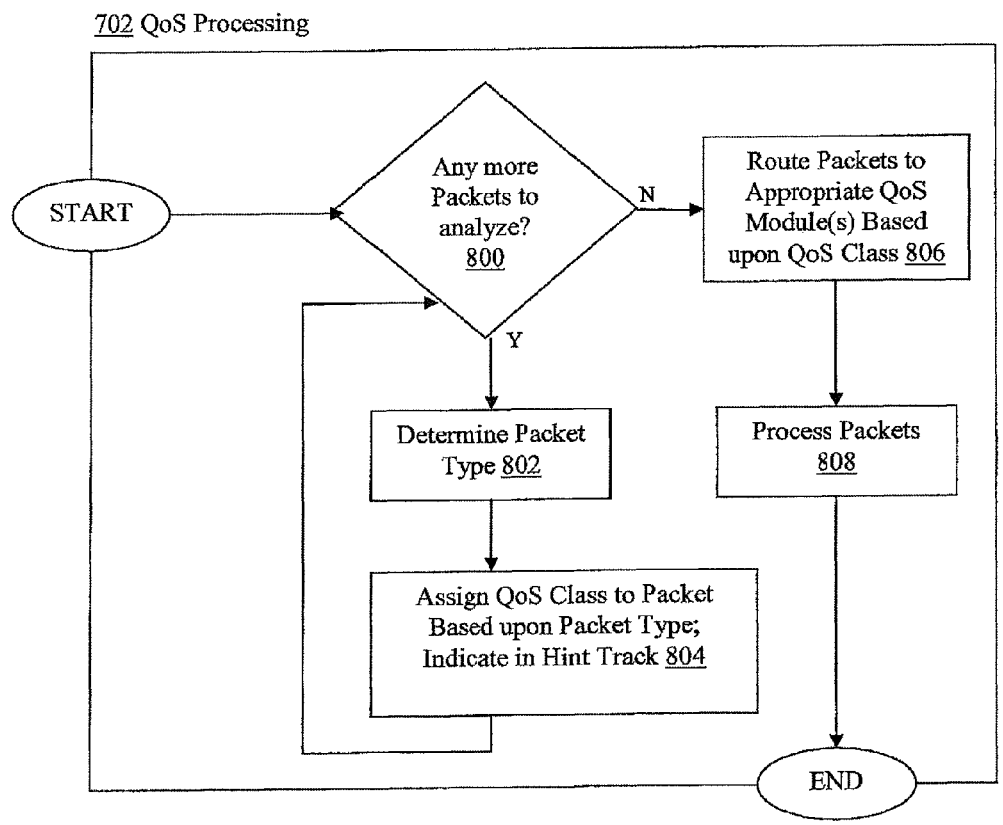
FIG. 8 is a logical flow diagram illustrating a method of accomplishing quality-of-service modulation according to one embodiment of the present invention.

FIG. 8 is a flow diagram illustrating a method of accomplishing QoS modulation according to a preferred embodiment of the present invention. Decision block 800 determines whether there are any more unprocessed data packets existing in an input data stream. For each unprocessed data packet in the input stream, a packet type is first determined at step 802, and this information is used to indicate an appropriate QoS class in a hint track. In a preferred embodiment, determining a QoS class by a packet type is accomplished by reading a table, database, or other data source comprising a mapping of packet types to corresponding QoS classes. Other approaches (such as reading this information directly from the hint track) may be used as well. When there are no more unprocessed data packets in the input stream, the data packets are then routed to appropriate QoS processing modules at step 806. The packets are then QoS processed if required at step 808.

Note that in alternative embodiments, each packet is routed to an appropriate QoS module immediately upon the packet's QoS assignment (step 804).

Figure 9:
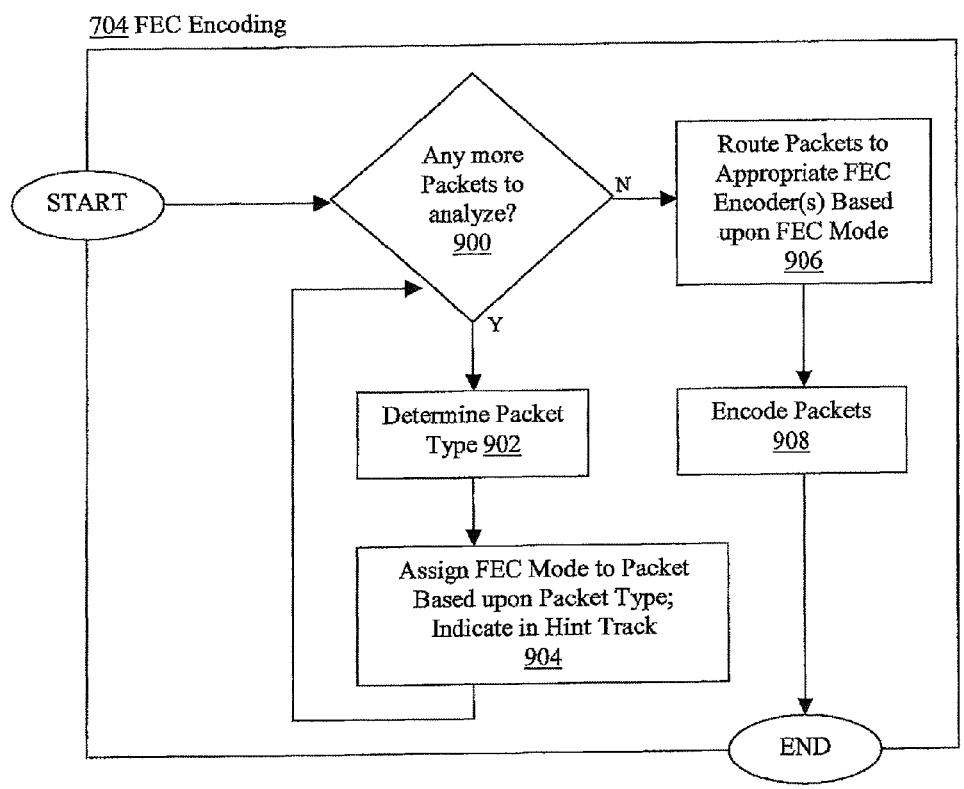
FIG. 9 is a logical flow diagram illustrating a method of accomplishing forward error correction encoding according to one embodiment of the present invention.

FIG. 9 is a flow diagram illustrating a method of accomplishing FEC encoding according to one embodiment of the present invention. Decision block 900 determines whether there are any more unprocessed data packets existing in an input data stream. For each unprocessed data packet in the input stream, a packet type is first determined at step 902, and this information is used to indicate an appropriate FEC mode in a hint track. In one variant, determining an FEC mode by a packet type is accomplished by reading a table, database, or other data source comprising a mapping of packet types to corresponding FEC modes. Other approaches recognized by those of ordinary skill may be used as well. When there are no more unprocessed data packets in the input stream, the data packets are then routed to appropriate FEC encoders at step 906. The packets are then FEC encoded at step 908. Note that in alternative embodiments, each packet is routed to an appropriate FEC encoder immediately upon FEC assignment (step 904).

Figure 10:
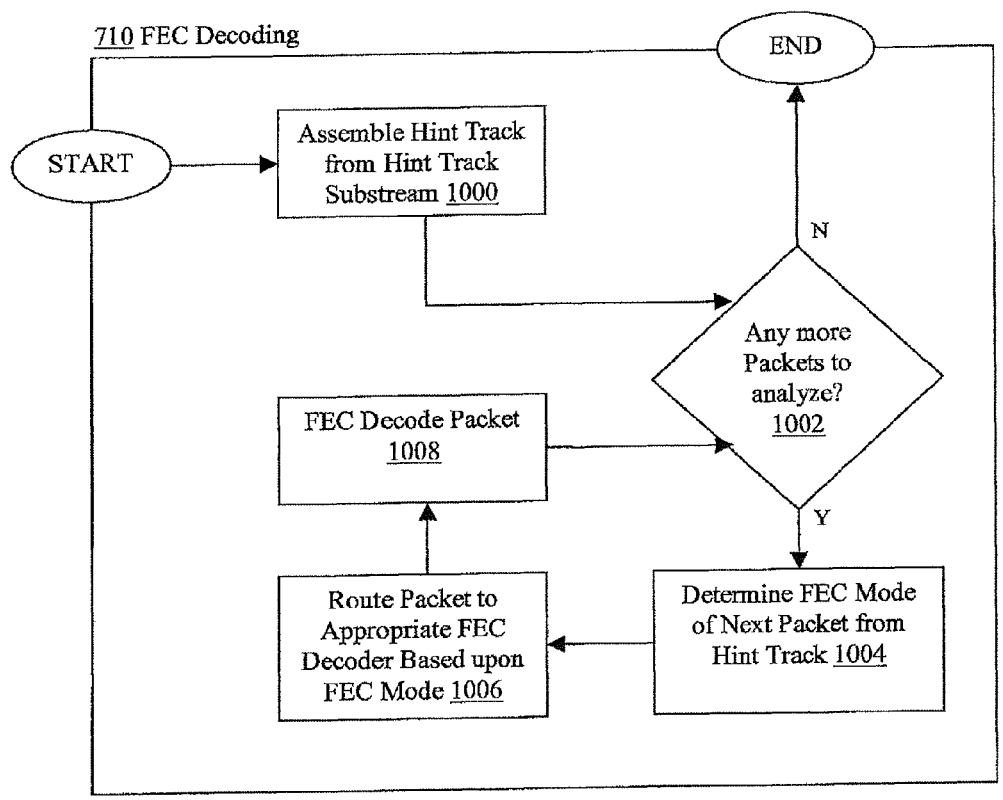
FIG. 10 is a logical flow diagram illustrating a method of accomplishing forward error correction decoding according to one embodiment of the present invention.

FIG. 10 is a flow diagram illustrating a method of accomplishing FEC decoding according to one embodiment of the present invention. At step 1000, a hint track is constructed from a received hint track substream. Control then passes to decision block 1002, which determines whether there are any more unprocessed packets in the received data stream. For each packet in the data stream, an FEC mode is determined at step 1004 based upon information comprised within the hint track. The packet is then routed to an appropriate FEC decoder at step 1006, and ultimately FEC decoded at step 1008. Note that in alternative embodiments, packets are routed to appropriate FEC decoders only after the FEC modes of all packets have been determined (step 1004).

Figure 11:
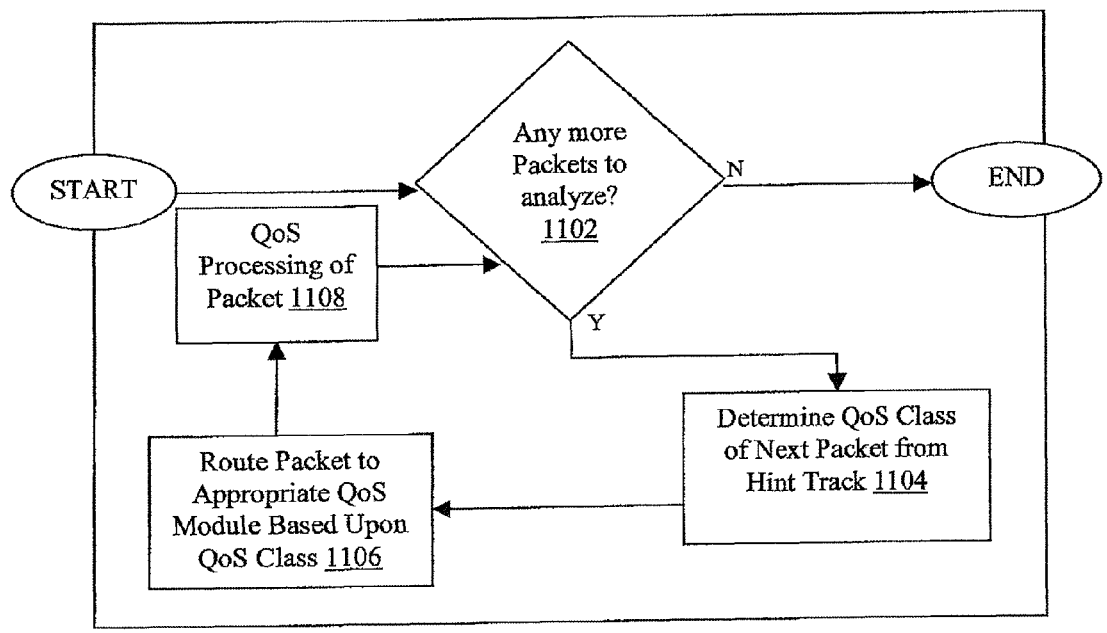
FIG. 11 is a logical flow diagram illustrating a method of accomplishing quality-of-service demodulation according to one embodiment of the present invention.

FIG. 11 is a flow diagram illustrating a method of accomplishing QoS Demodulation according to one embodiment of the present invention. Decision block 1102 determines whether there are any more unprocessed packets in the received data stream. For each packet in the data stream, a QoS class is determined at step 1104 based upon information comprised within a hint track. The packet is then routed to an appropriate QoS demodulator at step 1106, and ultimately QoS processed as required at step 1108. Note that in alternative embodiments, packets are routed to appropriate QoS processing modules only after the QoS classes of all packets have been determined (step 1104).

Integrated Circuit Embodiments

The foregoing QoS and/or FEC logic and functionality is in one embodiment combined into an integrated circuit (IC) of a desired level of integration (e.g., VLSI, ULSI, SoC), which may be application-specific (ASIC) or otherwise. Alternatively, the functionality disclosed herein may be rendered from a plurality of more discrete components if desired.

The aforementioned logic (whether in discrete or integrated form) may also be incorporated within other components, such as for example within a portion of a microprocessor or digital processor, ASIC, wireless PHY or transceiver IC device, and so forth. To this end, the processor or other device can utilize a software or firmware routine stored in memory (e.g., a program memory on the IC) in order to implement the QoS/FEC logic of the invention.

Supervisory functions may also be implemented in this fashion; e.g., such as wherein the processor includes a higher-level algorithm or software process which evaluates various "costs" and "benefits" in terms of various available courses of action. For instance, in one variant, decision logic in the form of a computer program operative to run on the aforesaid IC is used to evaluate and rank packets as to their QoS or FEC priorities based for example on the type of content being transmitted. Network conditions and use of various communication channels may also be a factor considered by such supervisory process. The selected FEC encoder/decoder pairs previously referenced herein may also be evaluated and selected by this process; i.e., so as to pick the optimal encoder/decoder for the current access medium conditions and/or multimedia packet type.

Myriad other applications and configurations of the circuit of the present invention will be readily apparent to those of ordinary skill when provided the present disclosure.

Client Device

Figure 12:
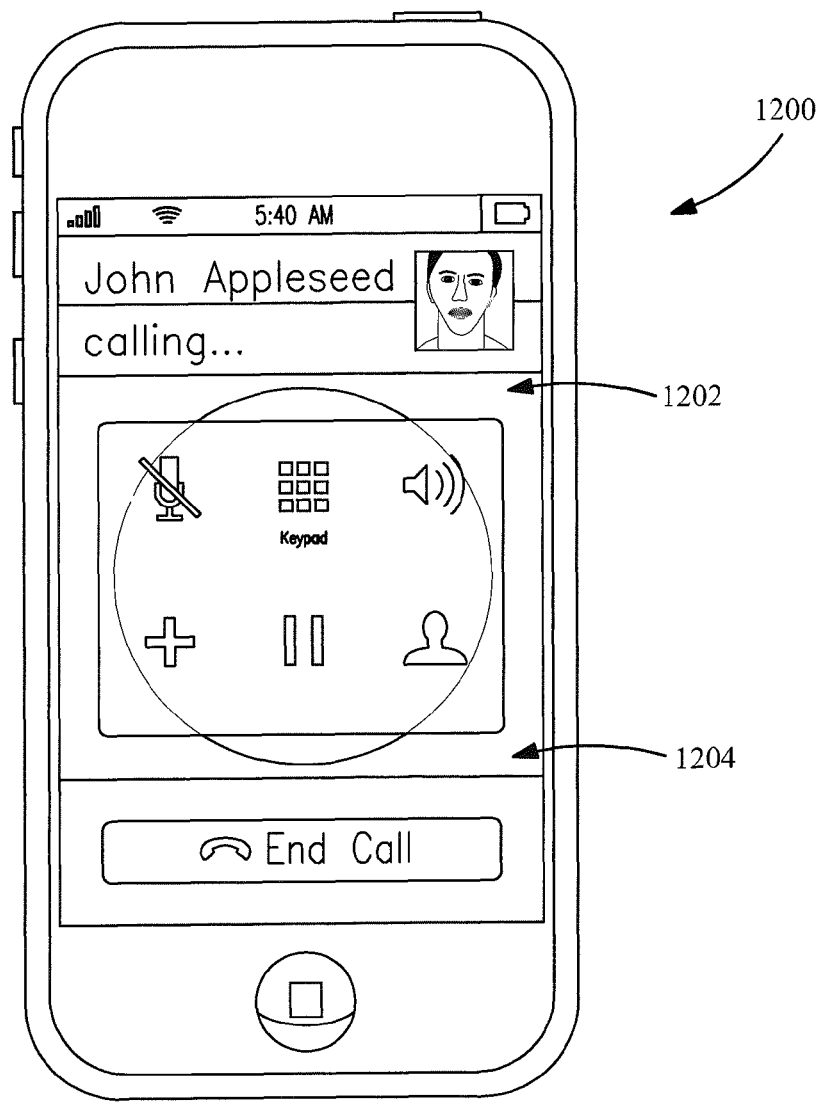
FIG. 12 is an elevation view of a mobile device (MD) configured in accordance with one embodiment of the invention.

Referring now to FIG. 12, one embodiment of an exemplary client device useful with the QoS/FEC functionality of the present invention is disclosed. While a mobile device (e.g., akin to the iPhone™ product manufactured by the Assignee hereof) is shown for illustration purposes, it will be appreciated that the client device need not be mobile (and need not be a telephony device) in order to practice the invention; for instance, the invention can readily be applied to desktop computers connected over a wired or wireless access medium. Moreover, the invention can be readily applied to a wireless or cellular base station (e.g., base station transceiver or controller) of the type well known in the telecommunications arts.

The mobile device (MD) 1200 of FIG. 12 includes an input device such as for example a keypad 1204 (which may comprise a keypad with actual keys, or a graphical "virtual" keypad/touch screen of the type now ubiquitous in the art) used for the input of information including for example telephone numbers, contact names, requested applications, requested services, or the like and a display 1202 for viewing information.

Additionally, the mobile communication device 1200 may include a scroll wheel (not shown) of the type pervasive in the art for moving through menus and other input and selection activities. Other input devices well known in the art including, e.g., a full keyboard or a mouse replacement such as jog wheels and touch screen, and/or non-tactile inputs such as speech recognition (e.g., CELP-based voice compression), are consistent with the use of embodiments of the invention as well.

The MD 1200 is, in one embodiment, a cellular telephone or "smart-phone" having at least one wireless air interface or radio area network (RAN) associated therewith, but any other type of computerized communication device may be employed in certain embodiments of the invention. For example, a laptop computer with a wireless interface connection such as a WiFi or 3G/UMTS card could be used as an MD 1200, The MD 1200 is, in one embodiment, a "thin" device which blindly operates based on the aforementioned capabilities. In another embodiment, the MD 1200 is a "thick" or "fat" client which intelligently signals to the access network its capabilities. The application server may then adjust its behavior accordingly. In one example, the interface between the access network and the application server operates at a significantly greater speed than the interface between the access network and the mobile device. Based on the mobile device feedback, and/or access network feedback, the application server may choose to modify its service "on the fly".

The MD 1200 preferably interfaces with a base station or other access point via modulated radio frequency electromagnetic signals (RF signals) that are modulated in accordance with one or more communications standards. Examples of useful standards include, inter alfa, GSM, UMTS, CDMA-2000, W-CDMA, EDGE, IEEE 802.16, 802.15 or 802.11. The use of other standard or non-standard/proprietary wireless interfaces is also consistent with the invention. Multiple such interfaces may also be used, such as where the MCD has a primary (cellular) air interface, as well as a WiFi and/or Bluetooth interface.

Typically, the MD 1200 will include one or more microprocessors, and memory for storing programs that are executed by the microprocessor(s). Other signal processing capability may be used, such as where a DSP is used for processing of visual, audio, or other data, in conjunction with a "host" or other processor such as the well known ARM7/9/10 families of RISC devices. Software of the type well known in the art controls the operation of the MD including processing input, generating display data and menu structures, and generating messages to be transmitted via the wireless link.

Figure 13:
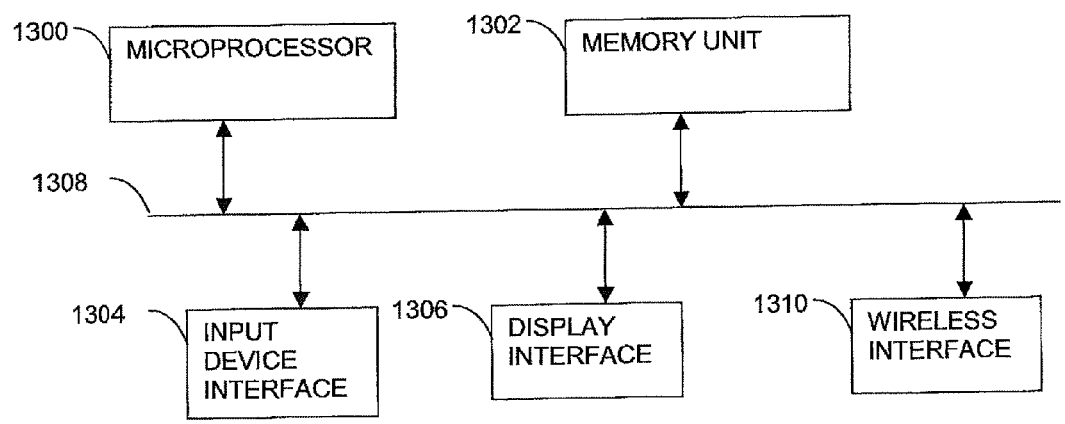
FIG. 13 is a simplified block diagram of the exemplary mobile device of FIG. 12.

FIG. 13 is a simpled block diagram of mobile device 1200 configured in accordance with one embodiment of the invention. The microprocessor 1300 and memory unit 1302 are coupled to a data bus 1308. The memory unit 1302 can include RAM, ROM and any other data storage device included in the mobile communications device 1200, although these storage functions may also be distributed across various components (such as where a microprocessor or DSP has on-chip SRAM, in addition to discrete DRAM or NAND flash, or on-board cache memory within the microprocessor 1300). The memory unit(s) 1302 stores, inter alia, the software instructions that control the operation of the mobile device and FEC/QoS protocols described herein.

Other functional units are also coupled to the data bus 1308 including, e.g., a "keypad." interface 1304, display interface 1206 and wireless interface 1310. These interfaces provide input-output functions to their respective systems within the mobile communications device 1200. For example, data is transmitted to and received from external entities via the wireless interface 1310 as previously described herein, to include for example PHY functions and other functions necessary for the air interface specification(s) used by the MD. Input is received from keypad interface 1304, and the information to display is transmitted through display interface 1306.

In one embodiment, the MD 1200 further includes software comprising a plurality of modules (not shown) including inter alia: (i) a QoS manager (ii) an FEC manager, which implement the various methodologies described previously with respect to FIGS. 2-11 for packet classification, and processing and encoding, respectively.

It will be understood that other configurations of the MD 1200 are consistent with various other embodiments of the invention, including for the use of multiple data buses and direct connections (e.g., DMA or the like) between various elements of the mobile communication device, including the microprocessor. The device architecture may also be optimized for certain functions, such as power conservation, gaming/video applications, etc. For example, various of the functions described herein may also be configured with "sleep modes" of the type well known in the art in order to conserve precious mobile device power when such functions are not in use.

Additionally, the various elements of FIG. 13 may be combined into single functional units or chip-level aggregations (e.g., SoC devices) as previously described, or separated into multiple functional units which together provide the same or similar functionality. Multiple entities providing similar functionality may also be used including, e.g., two microprocessors that are focused on performing different tasks, such as one microprocessor for controlling the wireless interface (including the QoS and FEC PHY functions previously referenced herein), and another microprocessor for controlling the application/user interface functions.

Application Server Device

Figure 14:
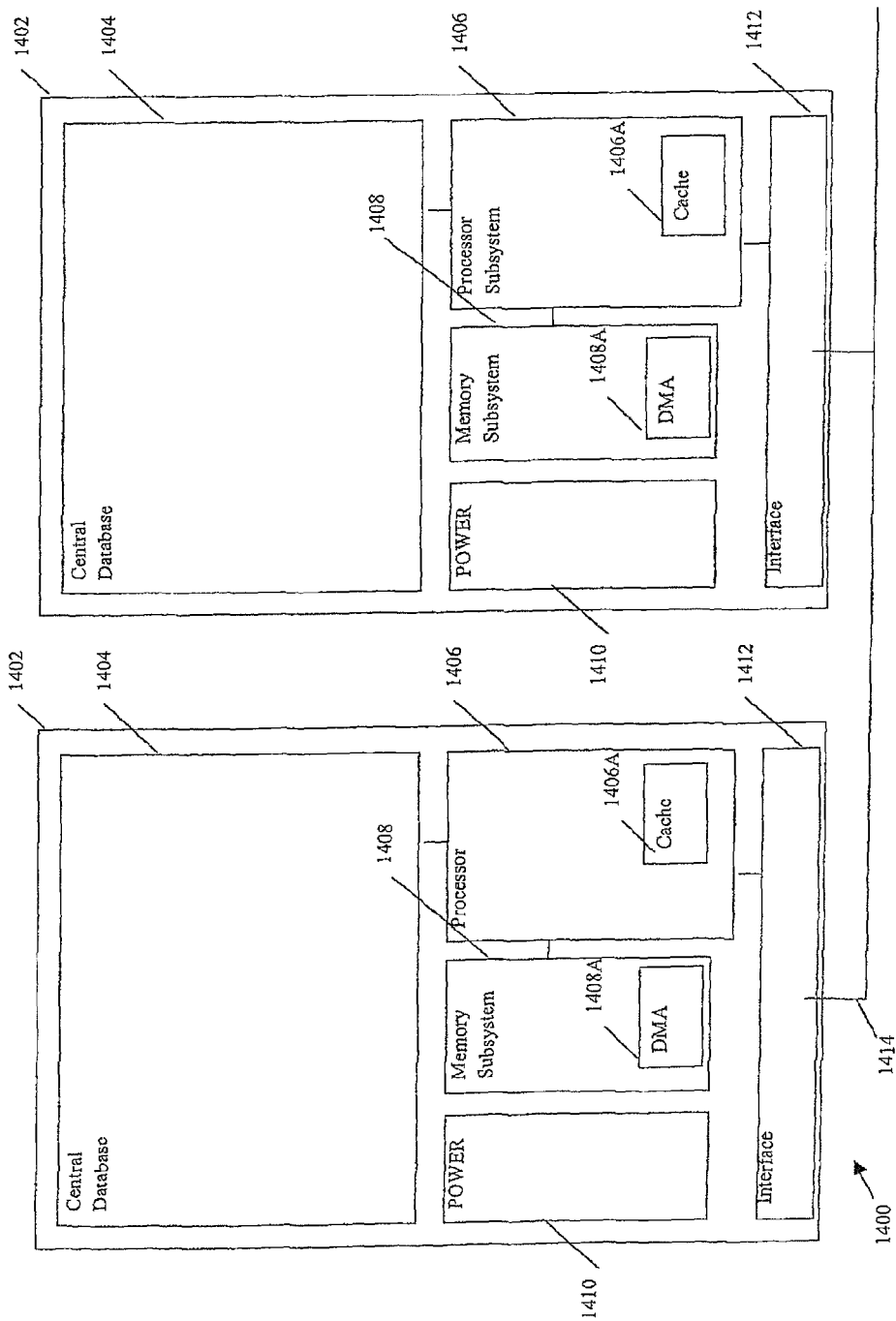
FIG. 14 is a simplified block diagram of one embodiment of an application server architecture according to the invention.

Referring now to FIG. 14, one embodiment of the central application server subsystem 1400 useful in implementing the methods of the present invention is illustrated. The apparatus disclosed comprises, inter alia, a server structure such as a computer, or plurality of computers (shown), logically connected to form a larger application server entity.

The apparatus 1400 comprises one or more server units having (or in data communication with) a central database 1404, processor 1406, operational memory 1408, power 1410, and external network interface 1412. The server units are connected by an external bus 1414 in the illustrated embodiment (which also connects to other devices, such as those of the various access networks described previously herein), although it will be appreciated that other communication media (such as a wireless or optical interface) may be utilized consistent with the invention.

As shown in FIG. 14, the central database 1404 may be divided among many individual machines, but remain one logically coherent database. The central database comprises a listing of multimedia content (e.g. video, audio, text, etc.), and algorithms adapted to QoS assignment, stored to computer readable media (e.g. hard drive, etc.). Similarly, both servers of FIG. 14 can be served by a common database if desired, which may or may not be co-located or proximate to the servers.

The processor subsystem 1406 may comprise a microprocessor, digital signal processor, field-programmable gate array, or plurality of processing components. The processing subsystem may also comprise an internal cache memory 1406A. The processing subsystem is in data communication with the logical central database 1404, a memory subsystem 1408, and an external network interface 1412 which is adapted to provide content to access network components.

The memory subsystem 1408 may comprise one or more memory components which may for example, include non-volatile (e.g. ROM, FLASH, etc.), and volatile (e.g. RAM, DDR-RAM, QDR-RAM, etc.) components. The memory subsystem may also comprise DMA type hardware 1408A, so as to facilitate data accesses.

The illustrated power management subsystem (PMS) 1410 provides power to the server unit, and may comprise an integrated circuit and or a plurality of discrete electrical components.

Applications (not shown) running on the processor subsystem 1406 are used to implement the aforementioned functionality; e.g., embedding one or more frame tags for QoS/FEC management purposes within one or more media streams, although this may also be accomplished in other fashions (e.g., through use of embedded firmware).

Methods of Doing Business

In another aspect of the invention, a method of doing business is disclosed.

In one embodiment, the method comprises first providing a user a multimedia capable device, the device comprising a wireless interface adapted to communicate multimedia data over a wireless network. The device is then enabled to transmit to an access network a set of classification rules for data packets subsequently received from the radio access network, each of the classification rules associated with a QoS and/or error correction encoding policy of the radio access network. Subsequent transmissions from the radio access network to the device comprising: evaluating at the radio access network, data packets received from an application server, to identify ones of a plurality of different application-layer frame types contained therein; and applying different quality-of-service (QoS) policies to respective ones of the different frame types; and receiving consideration from the user for at least one of the providing and enabling.

In another embodiment, the method comprises first providing a user a multimedia capable device, the device comprising a wireless interface adapted to communicate multimedia data over a wireless network. The device is then enabled to transmit the multimedia data. The transmission comprises: evaluating the data to identify ones of a plurality of different frame types contained therein; and applying different quality-of-service (QoS) policies to respective ones of the different frame types; and receiving consideration from the user for at least one of the providing and enabling.

In one variant, the multimedia capable device comprises a 3G-capable smartphone, and the wireless network comprises a 3G cellular network, and the evaluation of the data comprises reading at least one hint track associated with the multimedia data to identify at least one frame tag disposed therein.

In one exemplary embodiment, an iTunes movie that is viewed on a client device as it is being streamed will have a very different QoS requirement set for P-frames, B-frames, and I-frames, than an iTunes movie that is downloaded to the client device in the background for later viewing offline. As QoS requirements directly impact access network management, applications with high QoS requirements may be charged at a much higher rate, than applications which do not require QoS or which require very little QoS. In one example, a user hits the pause button during live streaming of multimedia, the application server might continue to stream multimedia packets, only with a background QoS, as opposed to a real-time streaming QoS, consequently charging the user at a beneficial rate.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of communicating a plurality of data packets of a plurality of different data packet types by a computing device, the method comprising the computing device:
dynamically assigning at least one quality-of-service (QoS) class and at least one forward error correction (FEC) mode to each data packet of at least a portion of the plurality of data packets based on a data packet type of a corresponding data packet;
generating one or more elements indicating the at least one QoS class and the at least one FEC mode for each data packet of the at least a portion of the plurality of data packets; and
communicating the one or more elements and the plurality of data packets to a remote device,
wherein the at least one QoS class assigned to the corresponding data packet defines a QoS policy to apply to the corresponding data packet, and wherein the at least one FEC mode assigned to the corresponding data packet defines an error correction protocol to apply to the corresponding data packet.

2. The method of claim 1, wherein the computing device dynamically assigns the at least one QoS class to each corresponding data packet further based on one or more capabilities of the remote device.

3. The method of claim 1, wherein the one or more elements comprise frame tags, each frame tag including a packet identifier and a packet type indicator for a corresponding data packet, and the assigned at least one QoS class and the assigned at least one FEC mode are indicated by the packet type indicator.

4. The method of claim 1, further comprising:
encoding each data packet according to the at least one FEC mode assigned to the corresponding data packet.

5. The method of claim 1, wherein the one or more elements comprise frame tags, each frame tag including a packet identifier, a QoS class field, and a FEC field for a corresponding data packet.

6. The method of claim 1, wherein the computing device communicates the one or more elements and the plurality of data packets to the remote device via a media stream, and wherein the one or more elements are included within a hint track of the media stream.

7. The method of claim 1, further comprising processing QoS encoding/decoding at a medium access control (MAC) layer and processing FEC encoding/decoding at a physical (PHY) layer.

8. The method of claim 1, wherein the plurality of data packets comprise a first data packet of a first data packet type assigned a first QoS class and a second data packet of a second data packet type assigned a second QoS class, wherein the first and second QoS classes define different QoS policies to apply to the first and second data packets respectively.

9. A computerized device, comprising:
a processor;
at least one wireless interface in data communication with the processor; and
logic in data communication with the processor and the at least one wireless interface, the logic configured to cause the computerized device to:
receive a plurality of data packets;
receive one or more frame tags, each frame tag indicative of one or more quality-of-service (QoS) classes and one or more forward error correction (FEC) modes assigned to a corresponding data packet of at least a portion of the received plurality of data packets;
determine a QoS policy and an error correction protocol to apply to each data packet based on the frame tag for the corresponding data packet; and
process the plurality of data packets in accordance with the QoS policy and the error correction protocol that applies to each data packet,
wherein the one or more QoS classes and the one or more FEC modes are separately assigned to the corresponding data packet.

10. The computerized device of claim 9, wherein the logic is further configured to cause the computerized device to:
signal one or more functionalities of the computerized device to a second device that generates the one or more frame tags assigned to the at least a portion of the received plurality of data packets.

11. The computerized device of claim 10, wherein the assignment of the one or more QoS classes is based at least in part on the signaled one or more functionalities of the computerized device.

12. The computerized device of claim 9, wherein the one or more frame tags are received via a hint track of a media stream.

13. The computerized device of claim 9, wherein the logic is further configured to cause the computerized device to:
process QoS encoding/decoding at a medium access control (MAC) layer and process FEC encoding/decoding at a physical (PHY) layer.

14. The computerized device of claim 9,
wherein the one or more frame tags are further configured to indicate a forward error correction scheme applied to the at least a portion of data packets,
wherein the logic is further configured to cause the computerized device to process each packet of the at least a portion of data packets via an FEC decoder of one or more FEC decoders based at least in part on the indicated forward error correction scheme.

15. The computerized device of claim 9, wherein the plurality of data packets comprises a first data packet of a first data packet type assigned a first QoS class and a second data packet of a second data packet type assigned a second QoS class, wherein the first and second QoS classes define different QoS policies to apply to the first and second data packets respectively.

16. A non-transitory storage medium adapted to store a plurality of instructions which are configured to, when executed by one or more processors of a computing device, cause the computing device to process data packets within a digital media stream by at least:
assigning one or more quality-of-service (QoS) classes and one or more forward error correction (FEC) modes to each data packet of at least a portion of the data packets within the digital media stream based on a data packet type of a corresponding data packet;
generating a set of frame tags, each frame tag including a packet identifier and an information element indicating the one or more QoS classes the one or more FEC modes for a corresponding data packet; and
transmitting the set of frame tags and the data packets to a receiving device,
wherein the one or more QoS classes assigned to the corresponding data packet define a QoS policy to apply to the corresponding data packet, and the one or more FEC modes assigned to the corresponding data packet define an error correction protocol to apply to the corresponding data packet, wherein the one or more QoS classes and the one or more FEC modes are separately assigned to the corresponding data packet.

17. The non-transitory storage medium of claim 16, wherein the set of frame tags are transmitted in a hint track associated with the digital media stream.

18. The non-transitory storage medium of claim 16, wherein the computing device assigns the one or more QoS classes and one or more FEC modes to each data packet further based on one or more functional capabilities supported by the receiving device.

19. The non-transitory storage medium of claim 16, wherein the plurality of instructions are further configured to, when executed by the one or more processors, cause the computing device to:
　　encode the at least a portion of the data packets according to one or more encoding schemes, wherein the information element further indicates the encoding scheme for the corresponding data packet.

20. The non-transitory storage medium of claim 16, wherein the data packets comprise a first data packet of a first data packet type assigned a first QoS class and a second data packet of a second data packet type assigned a second QoS class, wherein the first and second QoS classes define different QoS policies to apply to the first and second data packets respectively.

\* \* \* \* \*